United States Patent [19]
Takeda et al.

[11] Patent Number: 5,990,856
[45] Date of Patent: Nov. 23, 1999

[54] FERROELECTRIC LIQUID CRYSTAL ELEMENT AND FERROELECTRIC LIQUID CRYSTAL MATERIAL

[75] Inventors: Hitoshi Takeda, Tenri; Takashi Kaneko, Kashiwa; Masami Kido, Kashiwa; Mitsuhiro Koden, Kashiwa, all of Japan

[73] Assignees: Sharp Kabushiki Kaisha, Osaka, Japan; The Secretary of State for Defence in Her Britannic Majesty's Government of the United Kingdom of Great Britain and Northern Ireland, Hants, United Kingdom

[21] Appl. No.: 08/840,875

[22] Filed: Apr. 17, 1997

[30] Foreign Application Priority Data

May 16, 1996 [JP] Japan ................................. 8-122047

[51] Int. Cl.⁶ .................................................. G09G 3/36
[52] U.S. Cl. ............................ 345/97; 345/94; 345/204; 349/133
[58] Field of Search .................................. 345/97, 94, 96, 345/98, 87, 50, 210; 349/133, 128, 172

[56] References Cited

U.S. PATENT DOCUMENTS

| | | | |
|---|---|---|---|
| 5,005,953 | 4/1991 | Kawagishi | 349/172 |
| 5,026,144 | 6/1991 | Taniguchi et al. | 345/97 |
| 5,061,044 | 10/1991 | Matsunaga | 345/97 |
| 5,132,816 | 7/1992 | Itoh et al. | 349/133 |
| 5,227,904 | 7/1993 | Nakanowatari . | |
| 5,404,237 | 4/1995 | Katsuse et al. | 345/97 |
| 5,592,192 | 1/1997 | Kanabe et al. | 345/97 |

FOREIGN PATENT DOCUMENTS

| | | |
|---|---|---|
| 5-27090 | 4/1993 | Japan . |
| 06123877 | 5/1994 | Japan . |

OTHER PUBLICATIONS

U.K. Search Report mailed Jul. 7, 1997 for Application No. GB 9708238.2.

A. Yoshida et al., Lecture Papers of 13$^{th}$ Liquid Crystal Conference in 1987, pp. 142–143, "Characteristics of Switching Behavior of SSFLC."

*Primary Examiner*—Dennis-Doon Chow
*Assistant Examiner*—Amr Awad

[57] ABSTRACT

In a ferroelectric liquid crystal element, in order to excite a reverse electric field within the element in response to a waveform of a non-rewriting voltage, properties of the ferroelectric liquid crystal material, an element structure, driving waveforms, or other factors are adjusted so that molecules of the ferroelectric liquid crystal are allowed to switch between bistable states in response to a waveform of a rewriting voltage, while the ferroelectric liquid crystal exerts an anti-memory phenomenon in response to a waveform of a non-rewriting voltage.

16 Claims, 13 Drawing Sheets

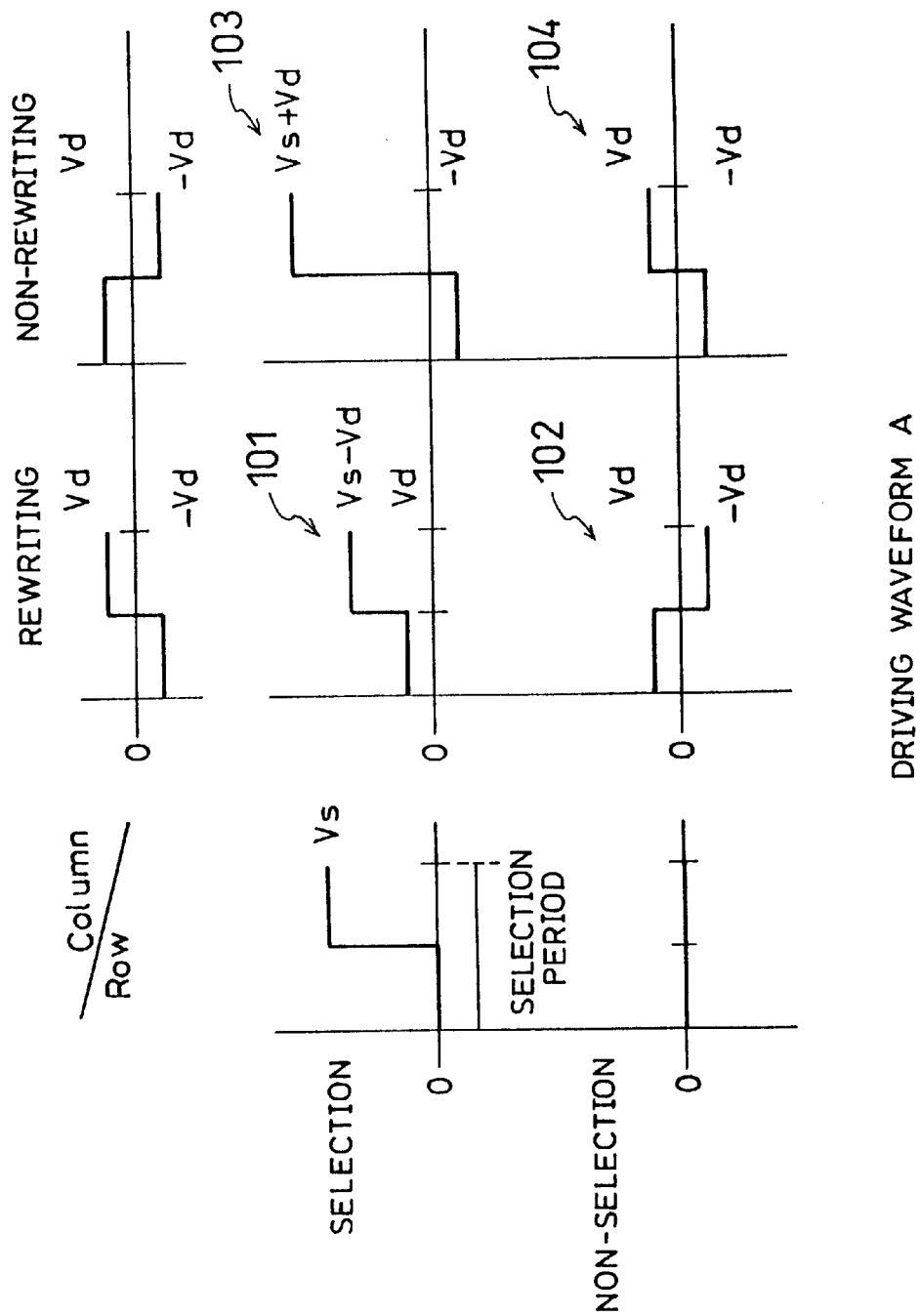

FIG. 6(a)
+ NON-REWRITING-VOLTAGE WAVEFORM
○ REWRITING-VOLTAGE WAVEFORM
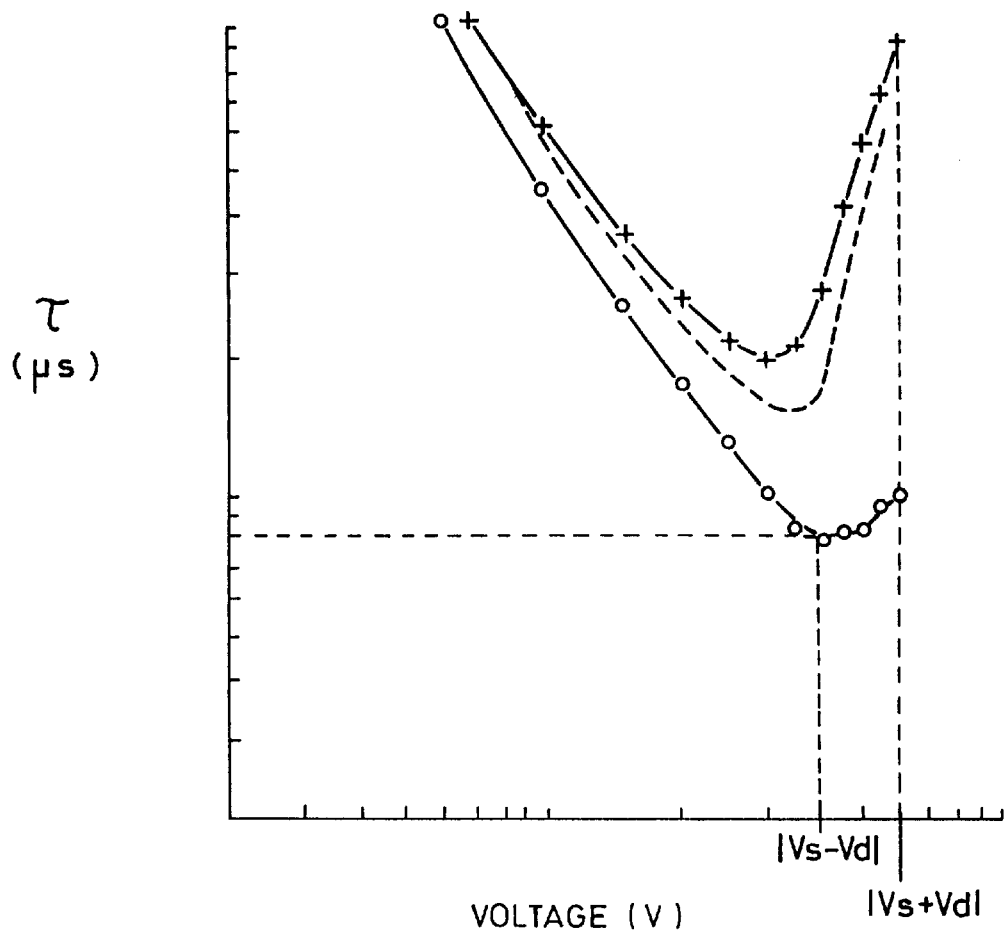
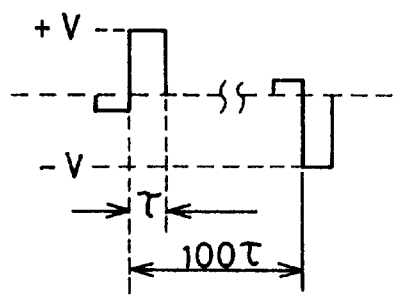
NON-REWRITING-VOLTAGE WAVEFORM
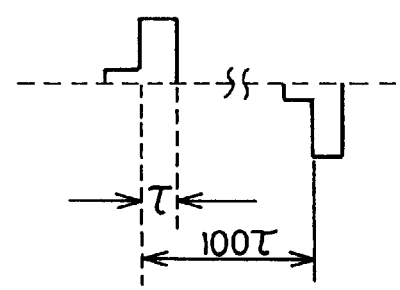
REWRITING-VOLTAGE WAVEFORM

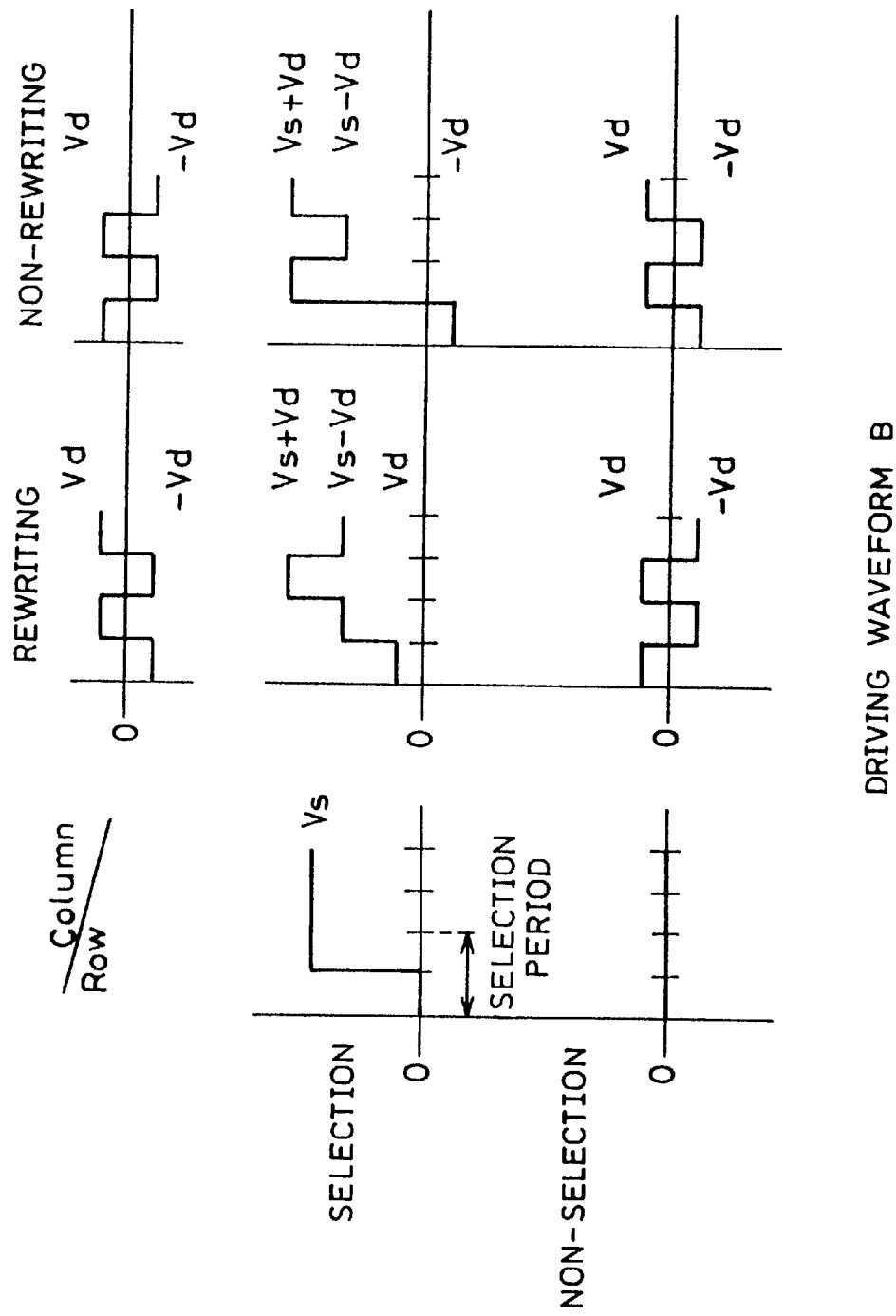

FERROELECTRIC LIQUID CRYSTAL ELEMENT AND FERROELECTRIC LIQUID CRYSTAL MATERIAL

FIELD OF THE INVENTION

The present invention relates to a ferroelectric liquid crystal element using a ferroelectric liquid crystal, and also concerns a ferroelectric liquid crystal material which is used in the ferroelectric liquid crystal element.

BACKGROUND OF THE INVENTION

Recently, tremendous research efforts have been directed toward various display modes using smectic phases in addition to research efforts toward liquid crystal elements using the nematic phase, and in particular surface-stabilized ferroelectric liquid crystal elements have been considered highly prospective since they have superior features, such as a wide angle of view, fast response and bistability, and are applicable to passive-matrix-type displays with large display capacities. The surface-stabilized ferroelectric liquid crystal elements are disclosed in, for example, Appl. Phys. Lett., 36,899 (1980) by N. A. Clark et al.

The passive-matrix-type displays have a construction wherein an insulating substrate having a plurality of scanning electrodes that are formed in parallel with one another and an insulating substrate having a plurality of signal electrodes that are formed in parallel with one another are placed so that the scanning electrodes and the signal electrodes orthogonally intersect each other, and a liquid crystal is sandwiched between the insulating substrates. Regions at which the scanning electrodes and the signal electrodes intersect each other form respective pixels. Thus, the difference voltage between a voltage applied to each of the scanning electrodes and a voltage applied to each of the signal electrodes is applied to each of the pixels.

During a period when, upon driving, a certain scanning electrode is selected, a selection-voltage waveform is applied to the scanning electrode, and signal-voltage waveforms, which correspond to states to be displayed on the respective pixels on the scanning electrode, are applied to the signal electrodes that correspond to the respective electrodes. In this manner, the scanning electrodes are successively selected while at the same time the pixels on the respective scanning electrodes are allowed to have desired display states, thereby forming a display of one frame. Therefore, the signal-voltage waveforms that correspond to the display states on the scanning electrode that is currently being selected are also applied to respective pixels on scanning electrodes that are not selected; however, a driving waveform which prevents these signal-voltage waveforms from changing the display state is adopted.

In the case of the surface-stabilized ferroelectric liquid crystal element, only two states of display, "bright" and "dark", are basically displayed because of its bistability. Therefore, with respect to signal-voltage waveforms for driving the surface-stabilized ferroelectric liquid crystal element, only two types of waveforms are necessary; a signal-voltage waveform that instructs "rewriting" for making a switchover from one stable state to the other stable state and a signal-voltage waveform that instructs "non-rewriting" for retaining the stable state that was held immediately before. Therefore, the driving operation of the surface-stabilized ferroelectric liquid crystal element is carried out by using a driving-voltage waveform that satisfies the following conditions:

(1) the display state should be rewritten by a rewriting-voltage waveform that is applied to a pixel by the combination of the signal-voltage waveform that instructs "rewriting" and the selection-voltage waveform, (2) the display state should not be rewritten by a non-rewriting-voltage waveform that is applied to a pixel by the combination of the signal-voltage waveform that instructs "non-rewriting" and the selection-voltage waveform, (3) during the non-selection period, the display state should not be rewritten by any of the states "rewriting" and "non-rewriting" of the signal-voltage waveforms.

In general, whichever display state, "rewriting" or "non-rewriting", the voltage waveform to be applied to a pixel may instruct, the display state is maintained when the voltage or pulse width within the voltage waveform does not reach a threshold value, and the display state is rewritten when both the voltage and pulse width exceed the respective threshold values.

Actually, since the threshold value has variations to a certain extent for each minute region of a pixel, a driving margin ranges from not less than a threshold value for completely switching all the region of a pixel by using the rewriting-voltage waveform to not more than a threshold value for completely retaining the display state of all the region of a pixel by using the non-rewriting-voltage waveform. The driving margin is greatly dependent on the difference between the rewriting-voltage waveform and the non-rewriting-voltage waveform, that is, the degree of the mutual difference between the signal-voltage waveforms that instruct "rewriting" and "non-rewriting".

Various properties including response speed, etc. in liquid crystal materials used for ferroelectric liquid crystal elements are greatly dependent on temperature, and the driving margin also varies depending on temperature changes in service environments. In other words, if the driving margin is narrow, the temperature range in which a liquid crystal element is operable also becomes narrow; therefore, it is necessary to provide an element and a driving method by which a wider driving margin is obtained.

Moreover, in the case of formation of a display element with a large display capacity by utilizing a high-speed response which is one of the features of a ferroelectric liquid crystal element, a problem of heat generation of the element is raised since a high-frequency voltage is required as the driving voltage. This is mainly because upon application of a high-frequency voltage, charging and discharging with high frequencies are carried out on the liquid crystal that is a dielectric so that the electrode lines through which the charging and discharging currents flow generate heat.

For example, in the case when a writing operation is carried out on 2000 scanning lines at 60 Hz per 1 frame by using a driving waveform whose unit pulse width constituting a driving-voltage waveform is a ½ of the selection period, a writing period of time per scanning line comes to 8.3 $\mu$s so that a signal-voltage waveform is applied to the signal electrode lines with a frequency of as high as 120 kHz. Moreover, in the case of gray-scale display using time division, a further high-frequency operation is of course carried out depending on the number of gradations.

The quantity of heat generation of an element due to the application of a high-frequency voltage resulted from utilization of such a high-speed response is dependent on factors, such as the frequency and voltage value of a signal-voltage, the electrostatic capacitance of the element and the value of the electrode resistance. One method for easily reducing the heat generation is to reduce the signal voltage; however, this method reduces the mutual difference between the signal-voltage waveforms instructing "rewriting" and "non-rewriting", thereby failing to provide a preferable method since the driving margin is narrowed.

Furthermore, in order to achieve a ferroelectric liquid crystal element with such a large display capacity, a ferroelectric liquid crystal material allowing for a high-speed response is required. For this purpose, it is necessary to reduce the viscosity of the ferroelectric liquid crystal material or to increase the spontaneous polarization thereof. However, the excessive increase of spontaneous polarization causes problems, such as malswitching, thereby making it difficult for the ferroelectric liquid crystal material to be applied to display elements.

SUMMARY OF THE INVENTION

The objective of the present invention is to realize a ferroelectric liquid crystal element with a large display capacity by providing a wider driving margin so as to withstand temperature changes and low-voltage driving.

In order to achieve the above-mentioned objective, the ferroelectric liquid crystal element of the present invention, which is a ferroelectric liquid crystal element that is formed by sandwiching a ferroelectric liquid crystal between a pair of substrates having at least electrodes, is characterized in that molecules of the ferroelectric liquid crystal are allowed to switch between bistable states in response to a waveform of a rewriting voltage applied by the electrodes, while the ferroelectric liquid crystal exerts an anti-memory phenomenon in response to a waveform of a non-rewriting voltage.

In order to allow a ferroelectric liquid crystal to switch between two stable states, it is necessary to apply a voltage waveform having a voltage value or a pulse width that is not less than a threshold value. In general, if none of the voltage value and the pulse width are less than the threshold value, a good switching behavior is obtained; however, in the case of application of a voltage waveform having a voltage value or a pulse width that is far greater than the threshold value, there is often found a phenomenon wherein under certain conditions, the liquid crystal element no longer switches or even conditions for making it switch no longer exist. This phenomenon is referred to as the anti-memory phenomenon.

In conventional ferroelectric liquid crystal elements, the driving margin is provided as a range from not less than a threshold value for completely switching all the region of a pixel by using the rewriting-voltage waveform to not more than a threshold value for completely retaining the display state of all the region of a pixel by using the non-rewriting-voltage waveform. However, with the above-mentioned arrangement, the anti-memory phenomenon, which makes the liquid crystal element unswitchable irrespective of the voltage value or the pulse width, is exerted upon application of the non-rewriting-voltage waveform; thus, it becomes possible to obtain a wide driving margin. Consequently, it becomes possible to achieve advantages, such as reduction of the signal voltage as well as high speeds of element driving, high-frequency driving waveforms, and high speeds by the increase of the spontaneous polarization of the ferroelectric liquid crystal material, thereby making it possible to provide a high-resolution ferroelectric liquid crystal element with a large display capacity.

Further, in the above-mentioned arrangement, each of the paired substrates is preferably designed to have an alignment layer which has been subjected to a uniaxial alignment treatment, and the pointing direction of a chevron smectic-layer structure of the ferroelectric liquid crystal is preferably designed to become the same as the direction of the uniaxial alignment treatment of the alignment layer.

The ferroelectric liquid crystal has a so-called chevron structure wherein the layer structure bends in an arrow-point shape or a reversed arrow-point shape, and there are two types of orientation states: that is, C1 orientation wherein the pointing direction of the chevron structure is opposite to the direction of the uniaxial alignment treatment of the alignment layer and C2 orientation wherein it is the same as the direction of the uniaxial alignment treatment of the alignment layer. Further, the two types of orientation states are allowed to coexist inside the same element.

Since these two types of orientation states have respectively different driving characteristics, and since lightening deficiencies and hairpin deficiencies that occur in the border between C1 orientation and C2 orientation cause maldisplay and reduction of the contrast, it is preferable for the entire face of the element to have either one of the orientation states. In particular, from the standpoint of the driving voltage, response speed and quenching property, C2 orientation is more preferable than C1 orientation.

Moreover, in the above-mentioned arrangement, it is preferable for the ferroelectric liquid crystal to have a negative dielectric anisotropy.

One phenomenon resulting from the negative dielectric anisotropy of the ferroelectric liquid crystal is an AC stabilize effect. This phenomenon results in the effect that if, upon driving, an AC bias voltage is applied, fluctuations of liquid crystal molecules, caused by a signal-voltage waveform that is applied to the signal electrodes upon non-selection of the scanning electrodes and that reacts with the spontaneous polarization, are restricted so that the bistability as well as the memory angle is increased. Thus, it becomes possible to improve the display quality of a ferroelectric liquid crystal display.

Moreover, in the above-mentioned arrangement, the ferroelectric liquid crystal is preferably designed so as to have bistable states, and also to have a property wherein, in the relationship between the pulse width and pulse voltage of a unipolar pulse that is required for switching from one stable state to the other stable state, a pulse voltage for providing a minimum value of the pulse width exists.

In order to exert the anti-memory phenomenon only upon non-rewriting, it is preferable to set the voltage value of the main pulse in the non-rewriting-voltage waveform higher than the voltage value of the main pulse in the rewriting-voltage waveform. When the ferroelectric liquid crystal having the above-mentioned property is adopted, it becomes possible to set the voltage value of the main pulse in the non-rewriting-voltage waveform higher than that of the main pulse in the rewriting-voltage waveform.

Further, the above-mentioned arrangement is preferably modified so that pulse voltages of the first two time slots in the rewriting-voltage waveform are successively represented by $V_1$ and $V_2$ or $-V_1$ and $-V_2$, and so that pulse voltages of the first two time slots in the non-rewriting-voltage waveform are successively represented by $V_3$ and $V_4$ or $-V_3$ and $-V_4$. Then, said $V_1$, $V_2$, $V_3$ and $V_4$ are allowed to satisfy:

$$0<V_2<V_4 \text{ and } V_2-V_1<V_4-V_3.$$

By arranging the non-rewriting-voltage waveform as described above, it becomes possible to easily exert the anti-memory phenomenon only upon application of the non-rewriting-voltage waveform.

The ferroelectric liquid crystal material of the present invention, which is used for a ferroelectric liquid crystal element that is formed by sandwiching a ferroelectric liquid crystal between a pair of substrates having at least electrodes, is characterized in that molecules of the ferroelectric liquid crystal are allowed to switch between bistable states in response to a waveform of a rewriting voltage applied by the electrodes while the ferroelectric liquid crystal exerts an anti-memory phenomenon in response to a waveform of a non-rewriting voltage.

By adopting this liquid crystal display material, the anti-memory phenomenon, which makes the liquid crystal element unswitchable irrespective of the voltage value or the pulse width, is exerted upon receipt of the non-rewriting-voltage waveform; thus, it becomes possible to obtain a wide driving margin. Consequently, it becomes possible to achieve advantages, such as reduction of the signal voltage as well as high speeds of element driving, high-frequency driving waveforms, and high speeds by the increase of the spontaneous polarization of the ferroelectric liquid crystal material, thereby making it possible to provide a high-resolution ferroelectric liquid crystal element with a large display capacity.

Moreover, in the above-mentioned arrangement, it is preferable for the ferroelectric liquid crystal material to have a negative dielectric anisotropy, and it is possible to improve the display quality of the ferroelectric liquid crystal display by utilizing the AC stabilize effect resulted from the negative dielectric anisotropy.

Moreover, the ferroelectric liquid crystal material is preferably designed to have bistable states in the ferroelectric liquid crystal element, and also to have a property wherein, in the relationship between the pulse width and pulse voltage of a unipolar pulse that is required for switching from one stable state to the other stable state, a pulse voltage for providing a minimum value of the pulse width exists. With this arrangement, it becomes possible to set the voltage value of the main pulse in the non-rewriting-voltage waveform higher than that of the main pulse in the rewriting-voltage waveform, and it also becomes possible to easily exert the anti-memory phenomenon only upon application of the non-rewriting-voltage waveform.

Further, the above-mentioned ferroelectric liquid crystal material is preferably designed so that pulse voltages of the first two time slots in the rewriting-voltage waveform are successively represented by $V_1$ and $V_2$ or $-V_1$ and $-V_2$, and so that pulse voltages of the first two time slots in the non-rewriting-voltage waveform are successively represented by $V_3$ and $V_4$ or $-V_3$ and $-V_4$. Then, said $V_1$, $V_2$, $V_3$ and $V_4$ are allowed to satisfy:

$0<V_2<V_4$ and $V_2-V_1<V_4-V_3$.

Thus, it becomes possible to easily exert the anti-memory phenomenon only upon application of the non-rewriting-voltage waveform.

For a fuller understanding of the nature and advantages of the invention, reference should be made to the ensuing detailed description taken in conjunction with the

BRIEF DESCRIPTION OF THE DRAWINGS

FIGS. 4 are explanatory drawings of τ–V characteristics of ferroelectric liquid crystal elements.

FIG. 5 is a waveform diagram showing a driving waveform of the JOERS/Alvey driving method, which is one of the driving methods having a non-rewriting-voltage waveform that easily exerts an anti-memory phenomenon.

FIGS. 6 are drawings that show the principle of the JOERS/Alvey driving method, which is one of the driving methods having a non-rewriting-voltage waveform that easily exerts the anti-memory phenomenon: FIG. 6(a) is a graph that indicates the results of measurements on the minimum pulse width of the rewriting-voltage waveform that is required for allowing the ferroelectric liquid crystal element to completely switch between two stable states and the maximum pulse width of the non-rewriting-voltage waveform that is required for completely maintaining the stable state of the ferroelectric liquid crystal element held immediately before, in response to the selection voltage; FIG. 6(b) is a waveform diagram that shows a non-rewriting-voltage waveform; and FIG. 6(c) is a waveform diagram that shows a rewriting-voltage waveform.

FIG. 7 is a waveform diagram showing a driving waveform of the Malvern driving method, which is one of the driving methods having a non-rewriting-voltage waveform that easily exerts an anti-memory phenomenon.

DESCRIPTION OF THE EMBODIMENTS

[EMBODIMENT 1]

Referring to FIGS. 1 through 10, the following description will discuss one embodiment of the present invention.

Figure 1:
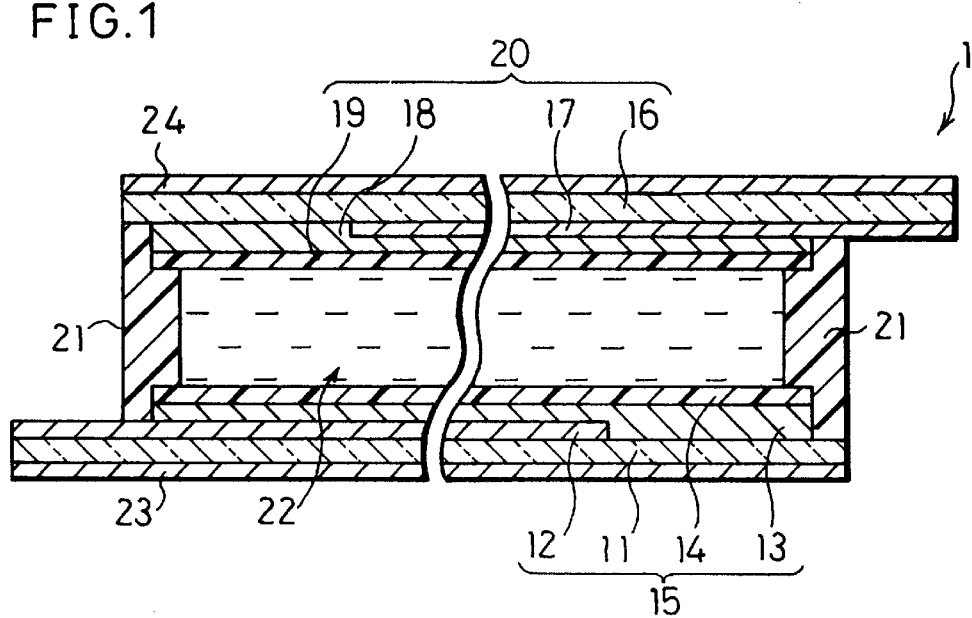
FIG. 1 is a cross-sectional view that shows a schematic construction of a ferroelectric liquid crystal element of one embodiment of the present invention.

FIG. 1 is a cross-sectional view that shows a schematic construction of a ferroelectric liquid crystal element 1 of one embodiment of the present invention. As illustrated in FIG. 1, the ferroelectric liquid crystal element 1 is provided with a lower substrate 15, which is constituted by a conductive film 12, an insulating film 13, and an alignment layer 14 that are successively stacked on an insulating substrate 11, and an upper substrate 20, which is constituted by a conductive film 17, an insulating film 18 and an alignment layer 19 that are successively stacked on an insulating substrate 16. The lower substrate 15 and the upper substrate 20 are bonded to each other by a seal agent 21, and a ferroelectric liquid crystal 22 is injected into the gap in between.

Polarization plates 23 and 24, which are used for optically discriminate switching of the optic axis, are placed on the respective sides of the insulating substrate 11 and the insulating substrate 16 that are opposite the ferroelectric liquid crystal 22. The ferroelectric liquid crystal element 1 is constituted by the above-mentioned members.

Figure 2:
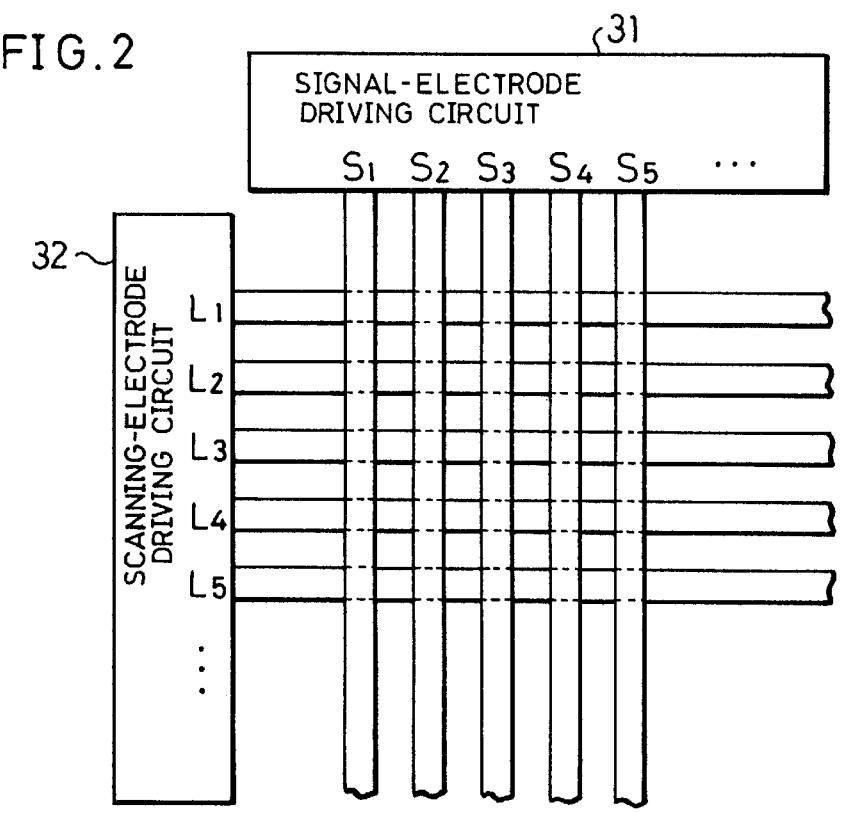
FIG. 2 is a plan view that schematically shows an electrode construction of a passive-matrix type that is provided in the ferroelectric liquid crystal element.

FIG. 1 merely shows a portion of the ferroelectric liquid crystal element 1 that corresponds to one pixel; however, the ferroelectric liquid crystal element 1 is applicable to a display apparatus with a large-capacity matrix. FIG. 2 is a schematic plan view that shows a construction of scanning electrodes and signal electrodes that are formed by the conductive film 12 and the conductive film 17. In the ferroelectric liquid crystal element 1, scanning electrodes L1, L2, L3, L4, L5 . . . , etc. and signal electrodes S1, S2, S3, S4, S5 . . . , etc. are arranged in a matrix format, and regions at which the scanning electrodes and the signal electrodes intersect each other form pixels.

These pixels are driven by voltages that are applied by a scanning-electrode driving circuit 32 and a signal-electrode driving circuit 31 which are respectively connected to the scanning electrodes L1, L2, L3, L4, L5 . . . , etc. and the signal electrodes S1, S2, S3, S4, S5 . . . , etc.

In other words, during a period in which a certain scanning electrode is selected, a selection-voltage waveform is applied to the scanning electrode from the scanning-electrode driving circuit 32, while signal-voltage waveforms, which correspond to display states of the respective pixels on the scanning electrode, are applied to the signal electrodes corresponding to the respective pixels from the signal-electrode driving circuit 31. Among the pixels on the selected scanning electrode, those pixels whose display states are to be rewritten are subject to application of rewriting-voltage waveforms. Those pixels whose display states are to be held are, on the other hand, subject to application of non-rewriting-voltage waveforms.

Thus, while the scanning electrodes are successively selected, the pixels on the respective scanning electrodes are successively allowed to have intended display states so that a display of one frame is formed. Here, although the signal-voltage waveforms that correspond to display states on the currently selected scanning electrode are also always applied to the pixels on the scanning electrodes that are not selected, they are not allowed to rewrite the display states.

The ferroelectric liquid crystal element 1 has an element structure which exerts the anti-memory phenomenon in response to the non-rewriting-voltage waveform upon driving. First, an explanation will be given of the anti-memory phenomenon and the element structure of the ferroelectric liquid crystal element 1. A detailed description of the driving method will be given later.

In order to allow a ferroelectric liquid crystal to switch between two stable states, it is necessary to apply a voltage waveform having a voltage value and a pulse width none of which are less than respective threshold values. In general, if none of the voltage value and the pulse width are less than the threshold values, a good switching behavior is obtained; however, in the case of application of a voltage waveform having a voltage value or a pulse width that is far greater than the threshold value, there is often found a phenomenon wherein under certain conditions, the liquid crystal element no longer switches or even conditions for making it switch no longer exist. Here, this phenomenon is referred to as the anti-memory phenomenon.

Conventionally, the anti-memory phenomenon has been regarded as an unwanted phenomenon which disturbs proper switching behaviors of a ferroelectric liquid crystal element, and for example, as described on pages 142 and 143 of presentation documents in "the 13th Liquid Crystal Conference (1987)" or in Japanese Examined Patent Publication No. 27090/1993 (Tokukouhei 5-27090), only techniques for preventing the anti-memory phenomenon have been researched and reported.

For example, the above-mentioned Japanese Examined Patent Publication No. 27090/1993 (Tokukouhei 5-27090) discloses that in order to obtain good switching characteristics, that is, in order to prevent the antimemory phenomenon, it is preferable to satisfy the following inequality:

$$Ci(nF/cm^2) \geq 2 \cdot P_s(nC/cm^2) - C_{LC}(nF/cm^2) \qquad (1)$$

where the capacity of an insulating film is represented by $Ci(nF/cm^2)$, the spontaneous polarization of the liquid crystal is represented by $P_s(nC/cm^2)$, and the capacity of the liquid crystal is represented by $C_{LC}(nF/cm^2)$.

In contrast to such conventional recognition, the ferroelectric liquid crystal element 1 of the present embodiment is devised to utilize the anti-memory phenomenon. In other words, a normal switching operation is carried out upon application of the signal-voltage waveform that instructs "rewriting", while the switching operation is prohibited by exerting the anti-memory phenomenon only upon application of the signal-voltage waveform that instructs "non-rewriting".

In order to exert the anti-memory phenomenon only upon application of the non-rewriting-voltage waveform, it is preferable to combine an element structure which relatively easily exerts the anti-memory phenomenon and a driving method having a non-rewriting-voltage waveform which allows the anti-memory phenomenon to be exerted relatively easily.

First, several conditions of the element structure that easily exerts the anti-memory phenomenon will be listed below. Here, as for preferable driving methods with which the element structure is combined, they will be discussed later.

In order to exert the anti-memory phenomenon easily, it is preferable to increase the reverse electric field that is induced inside the element upon application of a pulse voltage in the ferroelectric liquid crystal element 1. For this purpose, it is effective to reduce the capacity of the liquid crystal by using methods, such as reducing the capacities of the insulating films 13 and 18, using a liquid crystal material having a small dielectric constant as the ferroelectric liquid crystal 22, and increasing the thickness of the liquid crystal layer of the liquid crystal element, so as not to satisfy at least the aforementioned inequality (1). Further, the inventors of the present application have discovered that the film thicknesses of the alignment layers 14 and 19 also serve as one factor to give effects on the easy exertion of the anti-memory phenomenon.

In addition, properties of the alignment layers 14 and 19, such as polarity, or properties of the ferroelectric liquid crystal material except for the spontaneous polarization and the electrostatic capacity, also serve as factors to give effects on the easy exertion of the anti-memory phenomenon, and it has been discovered that it is possible to easily exert the anti-memory phenomenon by increasing the reverse electric field that is induced inside the element by adjusting these properties. Moreover, methods, such as adding an ionic substance or other substances to the ferroelectric liquid crystal material are also effective to increase the reverse electric field that is induced inside the element, thereby making it possible to easily exert the anti-memory phenomenon.

However, even if their respective values are individually adjusted, it is difficult for the above-mentioned various factors to allow the anti-memory phenomenon to be easily exerted, and it is preferable to adjust the values of these factors by taking into consideration the combinations with other factors or the combinations with various conditions regarding the non-rewriting-voltage waveform.

The following description will discuss a manufacturing method of the ferroelectric liquid crystal element 1.

The insulating substrates 11 and 16, which are light-transmitting substrates, are normally made of glass substrates or other materials. First, on the insulating substrates 11 and 16, a material such as $InO_3$, $SnO_2$, or ITO (Indium Tin Oxide) is deposited by the CVD (Chemical Vapor Deposition) method or the sputtering method, and the resulting films are patterned to have predetermined patterns; thus, the conductive films 12 and 17, which serve as scanning electrodes and signal electrodes, are formed. Here, the film thickness of the conductive films 12 and 17 is preferably set in the range of 50 to 500 nm.

Next, the insulating films 13 and 18, each of which has a film thickness of 20 to 200 nm, are formed on the respective conductive films 12 and 17. Inorganic thin-films made of materials, such as $SiO_2$, $SiN_x$, $Al_2O_3$, and $Ta_2O_5$, or organic thin films made of materials, such as polyimide, photoresist resin and high molecular liquid crystal, are used to form the insulating substrates 13 and 18.

Additionally, as described earlier, although the film thicknesses of the insulating films 13 and 18 serve as one factor to provide the ferroelectric liquid crystal element 1 with an element structure that allows the anti-memory phenomenon to be easily exerted, the easy exertion of the anti-memory phenomenon is dependent not only on the film thicknesses of the insulating films 13 and 18, but also on various other factors such as film thicknesses of the alignment layers 14 and 19 and other films, the properties of the ferroelectric liquid crystal 22 and the driving waveform. Therefore, the film thicknesses of the insulating films 13 and 18 are preferably adjusted within the above-mentioned range by taking into consideration the combinations with these other factors in order to exert the anti-memory phenomenon only upon application of the non-rewriting voltage waveform. Further, the same is true as for thicknesses, etc. of other films, such as the alignment layers 14 and 19, which will be described later.

When made of inorganic thin-films, the insulating films 13 and 18 are formed by methods, such as the vapor deposition method, the sputtering method, the CVD method and the solution-applying method. On the other hand, when made of organic thin-films, the insulating films 13 and 18 are formed by applying a solution of an organic substance or its precursor using the spinner coating method, the dip coating method, the screen printing method, the roll coating method or other methods, and by setting the coat under predetermined setting conditions (heat, light irradiation, etc.). Alternatively, when made of organic thin-films, the insulating films 13 and 18 may also be formed by the vapor deposition method, the sputtering method, the CVD method, the LB (Langumuir-Blodgett) method or other methods. However, these insulating films 13 and 18 are not necessarily required, and they may be omitted.

Next, the alignment layers 14 and 19 are formed with a thickness of 10 to 200 nm on the insulating films 13 and 18. In the case when the insulating films 13 and 18 are omitted, the alignment layers 14 and 19 are directly formed on the conductive films 12 and 17. The alignment layers 14 and 19 are formed by inorganic or organic thin films. With respect to inorganic materials for the alignment layers 14 and 19, silicon oxide or other materials are used, and the film-forming method is, for example, an oblique evaporation method, a rotation evaporation method or other methods. When organic materials are used, the alignment layers 14 and 19 are formed by using materials, such as nylon, polyvinyl alcohol and polyimide, and a rubbing treatment is normally applied to the upper surface thereof. Moreover, when the alignment layers 14 and 19 are formed by using high molecule liquid crystal or LB films, an alignment process, which uses a magnetic-field applying method, a spacer edge method or other methods, may be applied thereto. Furthermore, the alignment layers 14 and 19 may also be made by forming $SiO_2$, $SiN_x$, or other materials as films by using the vapor deposition method, the sputtering method, the CVD method or other methods, and by applying a rubbing treatment to the upper surface thereof.

The lower substrate 15 and the upper substrate 20 that have been formed as described above are bonded to each other by seal agent 21 with their alignment layers 14 and 19 facing each other, and a ferroelectric liquid crystal 22 is injected; thus, a ferroelectric liquid crystal element 1 is completed.

Next, the following description will discuss a uniaxial-alignment treatment method of the alignment layers 14 and 19 in the ferroelectric liquid crystal element 1. With respect to the uniaxial-alignment treatment method of the alignment layers 14 and 19 in the ferroelectric liquid crystal element 1, the most preferable method is a rubbing method. Here, the rubbing method is mainly classified into a parallel rubbing method, anti-parallel rubbing method and single rubbing method depending on rubbing directions of the lower substrate 15 and the upper substrate 20.

The parallel rubbing method is a method wherein after the alignment layers 14 and 19 of the lower substrate 15 and the upper substrate 20 have been subject to a rubbing treatment, the lower substrate 15 and the upper substrate 20 are bonded to each other so that the rubbing directions of the alignment layers 14 and 19 are aligned in the same direction. The anti-parallel rubbing method is a method wherein after the alignment layers 14 and 19 of the lower substrate 15 and the upper substrate 20 have been subject to a rubbing treatment, the lower substrate 15 and the upper substrate 20 are bonded to each other so that the rubbing directions of the alignment layers 14 and 19 are aligned in directions that are opposite each other and parallel to each other. The single rubbing method is a method wherein only either the alignment layer 14 of the lower substrate 15 or the alignment layer 19 of the upper substrate 20 is subject to a rubbing treatment.

Among these methods, the single rubbing method has a disadvantage in that a desired uniform orientation is hardly obtained. This is because the ferroelectric liquid crystal material, which is a liquid crystal material that is optically active, inevitably has a spiral structure in its nematic phase, and because when a phase transition takes place from the nematic phase to the smectic A phase upon cooling, the spiral structure of the nematic phase disturbs the uniform orientation of the normals of layers of the smectic A phase.

Further, the anti-parallel rubbing method tends to cause line-shaped defects along the rubbing direction, thereby also failing to provide the uniform orientation. In other words, in order to obtain the uniform orientation with aligned normals of smectic layers in the ferroelectric liquid crystal element 1, the most preferable uniaxial-alignment treatment method is the parallel rubbing method. In the parallel rubbing method, although the spiral structure appears in the nematic phase, it is easier to obtain the uniform orientation in the nematic phase since orientation directions of the molecules are regulated by both of the lower substrate 15 and the upper substrate 20. Thus, it is possible to easily obtain the uniform orientation with aligned directions of the normals of layers by decreasing the temperature from that state to the smectic A phase, and further to the chiral smectic C phase.

Additionally, with respect to the uniaxial-alignment treatment method for the alignment layers in the ferroelectric liquid crystal element 1, not only the rubbing method but also other methods, such as an oblique evaporation method, may be adopted.

In connection with the uniaxial-alignment treatment, the following description will discuss orientation states of a ferroelectric liquid crystal material in the ferroelectric liquid crystal element 1.

Figure 3:
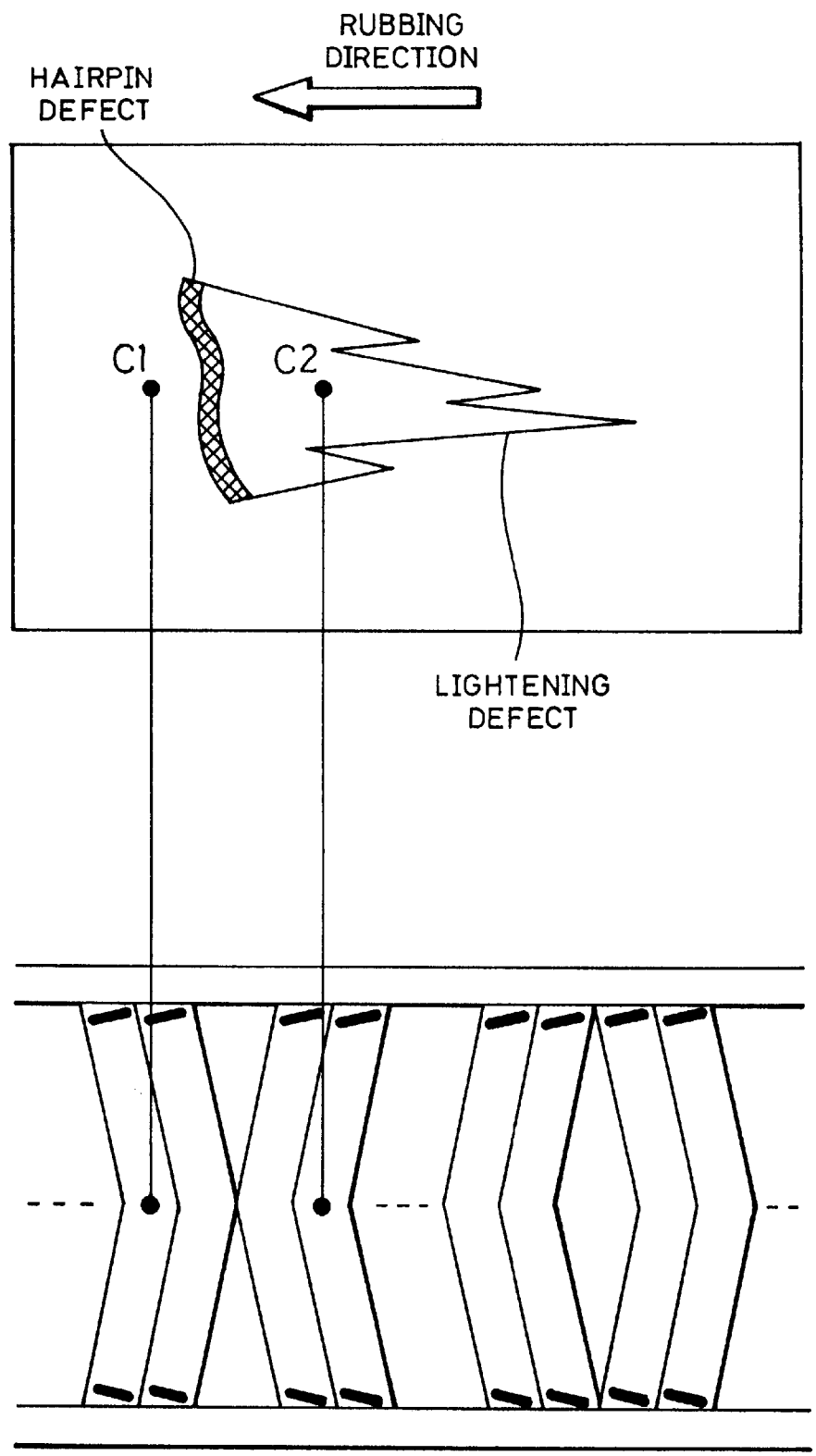
FIG. 3 is an explanatory drawing that shows an orientation state of a ferroelectric liquid crystal element and the resulting orientation defects.

J. Kanbe et al. have reported in Ferroelectrics, 114,3 (1991) that, as illustrated in FIG. 3, in a surface-stabilized ferroelectric liquid crystal element, the ferroelectric liquid crystal has a bent layer structure of an arrow-point shape or a reverse arrow-point shape (a so-called chevron structure), that orientation states of two types exist: C1 orientation wherein the pointing direction of the chevron structure is opposite the uniaxial-alignment treatment direction (the rubbing direction indicated by an arrow in FIG. 3) of the alignment layers 14 and 19, and C2 orientation wherein it is the same as the uniaxial-alignment treatment direction, and that the orientation states of two types may coexist within the same element.

Since the orientation states of two types have respectively different driving characteristics, and since lightening defects and hairpin defects, which occur in the border between C1 orientation and C2 orientation, cause degradation in the display and contrast, it is preferable to arrange the entire surface of the element to have either one of the orientation states. In particular, from the standpoints of the driving voltage, response speed and quenching property, C2 orientation is more preferable than C1 orientation. The orientation state of a ferroelectric liquid crystal material in the ferroelectric liquid crystal element is considered to be determined by various properties of materials, such as the ferroelectric liquid crystal material, the material of the alignment layers and the material of the insulating films, affinity of these materials, methods of the uniaxial-alignment treatment of the alignment layers, and conditions such as, for example, the rubbing strength.

The inventors of the present application have already applied for a patent protection of a technique for providing C2 orientation to the entire surface of an element, and this application has been published as Japanese Laid-Open Patent Publication No. 101370/1996 (Tokukaihei 8-101370).

Moreover, the uniaxial-alignment treatment allows the alignment layers 14 and 19 to have a pre-tilt angle, and it has been reported that in the case of the alignment layers 14 and 19 made of polyimide, the pre-tilt angle is set approximately in the range of 0 to 20°. However, in the case of a small pre-tilt angle, the difference between energy states of C1 orientation and C2 orientation is small, which makes it difficult to obtain the uniform orientation of either one of C1 and C2 orientation states over the entire surface of an element. In contrast, in the case of a great pre-tilt angle, it becomes difficult to have an orientation transition from C1 orientation to C2 orientation, and upon cooling from the smectic A phase to the smectic C phase, C1 orientation, which initially appeared, remains as it is. For this reason, the pre-tilt angle of the alignment layers 14 and 19 of the ferroelectric liquid crystal element 1 of the present embodiment is preferably set in the range of 1 to 15°.

The above-mentioned description has discussed a technique for exerting the anti-memory phenomenon by adjusting the element structure with respect to the properties of a liquid crystal material, various film thicknesses and other factors. Here, as is disclosed on page 143 in presentation documents of the aforementioned "13th Liquid Crystal Conference (1987)", it is determined by the relationship between the reverse electric field inside the ferroelectric liquid crystal element and the threshold voltage of the liquid crystal in response to a switch pulse (a driving waveform) with a certain pulse width whether or not a liquid crystal element switches in a bistable manner. In other words, it is possible to exert the anti-memory phenomenon only upon application of a non-rewriting-voltage waveform by using such a driving waveform as to allow the non-rewriting-voltage waveform to more easily exert the anti-memory phenomenon than the rewriting-voltage waveform, and by adjusting the properties of the element structure as described above.

Referring to some examples, the following description will discuss driving methods which use a non-rewriting-voltage waveform that easily allows the anti-memory phenomenon to be exerted.

These driving methods are preferably applied to a ferroelectric liquid crystal element using a ferroelectric liquid crystal material which has a negative dielectric anisotropy. Further, as illustrated in FIG. 4(b), the driving methods are characterized by utilizing the so-called $\tau$–$V_{min}$ characteristic wherein in the characteristics of the pulse voltage and the pulse width $\tau$ of a unipolar pulse that is required for allowing the liquid crystal element to switch from one stable state to the other stable state, the pulse width $\tau$ has a minimum value.

Figure 4A:
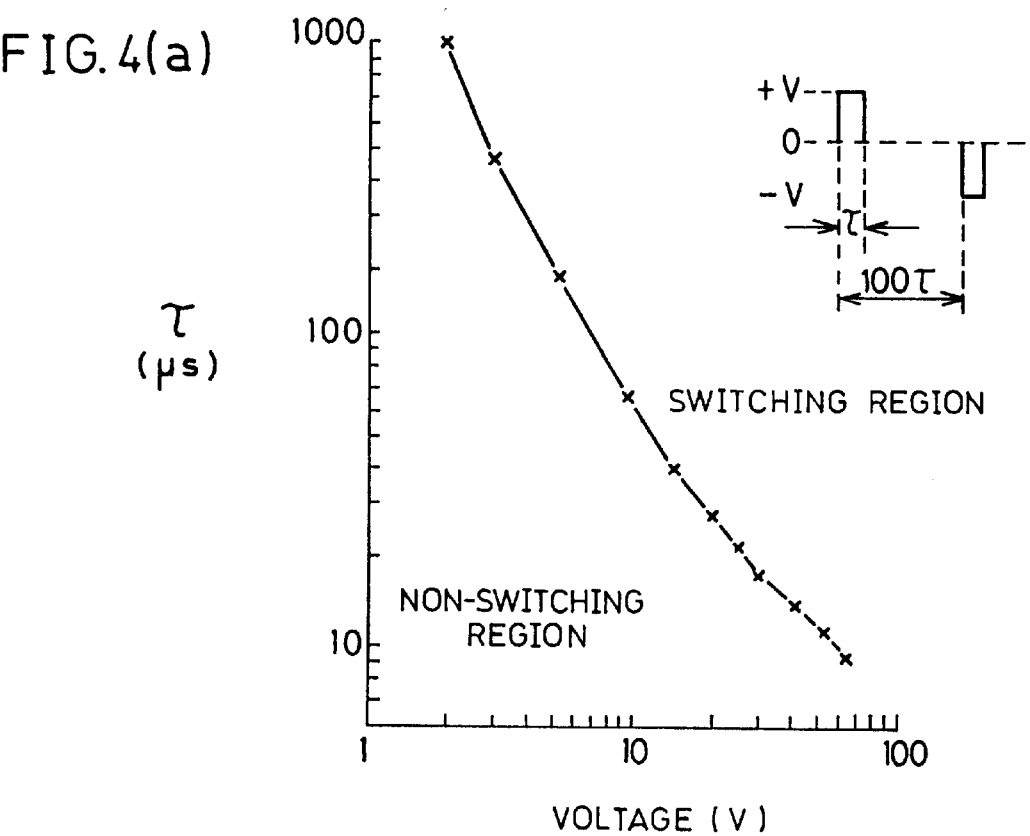
FIG. 4(a) is a graph showing a characteristic that is exhibited by a ferroelectric liquid crystal material which does not have a negative dielectric anisotropy.
Figure 4B:
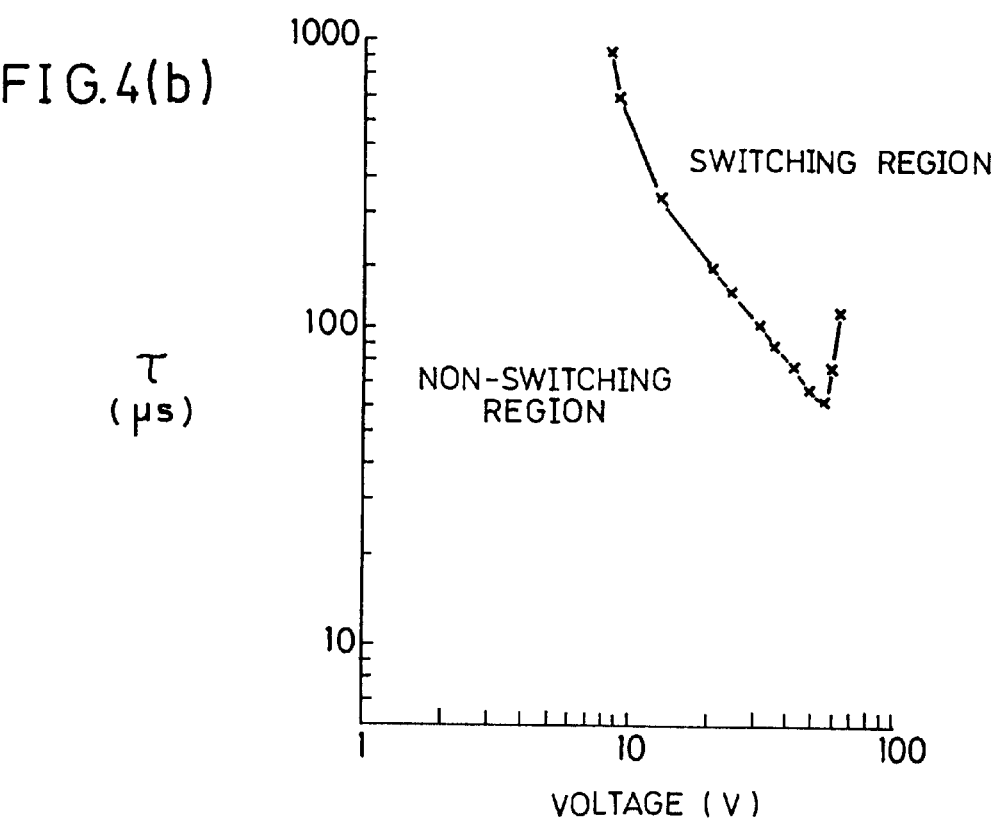
FIG. 4(b) is a graph showing the so-called $\tau-V_{min}$ characteristic that is exhibited by a ferroelectric liquid crystal material which has a negative dielectric anisotropy.

In the case of a ferroelectric liquid crystal material which does not have a negative dielectric anisotropy, the characteristics of the pulse voltage and the pulse width τ of a unipolar pulse, which are required for allowing the liquid crystal element to switch from one stable state to the other stable state, are indicated by FIG. 4(a). In other words, as the voltage of the unipolar pulse increases, the pulse width τ required for the switching decreases monotonically. In contrast, the ferroelectric liquid crystal material having a negative dielectric anisotropy exhibits the so-called τ-$V_{min}$ characteristic wherein the pulse width τ has a minimum value as shown in FIG. 4(b).

Additionally, Jones et al. have reported that in order to allow the pulse width τ to have a minimum value, the biaxial dielectric anisotropy is more important than the positive and negative of the dielectric anisotropy of the liquid crystal material (see J. C. Jones et al., Ferroelectrics,121, 91(1991)).

Surguy et al. have reported the so-called JOERS/Alvey driving method as a method utilizing the τ-$V_{min}$ characteristic, which uses driving waveform A as shown in FIG. 5 (see P. W. H. Surguy et al., Ferroelectrics,122, 63(1991)). The JOERS/Alvey driving method is one of the methods which have a non-rewriting voltage waveform that easily exerts the anti-memory phenomenon. Here, a waveform 101, shown in FIG. 5, indicates a voltage waveform that is exerted in pixels that correspond to intersecting regions between the scanning electrodes L1. . . , etc., and the signal electrodes S1 . . . , etc., that are arranged in a matrix format, when a selection voltage is applied to the scanning electrodes (Row) with a rewriting voltage being applied to the signal electrode (Column). Likewise, a waveform 102 indicates a voltage waveform that is exerted in the pixels when a non-selection voltage is applied to the scanning electrodes with the rewriting voltage being applied to the signal electrode; and a waveform 103 indicates a voltage waveform that is exerted in the pixels when the selection voltage is applied to the scanning electrodes with a non-rewriting voltage being applied to the signal electrode; and a waveform 104 indicates a voltage waveform that is exerted when the non-selection voltage is applied to the scanning electrodes with the non-rewriting voltage being applied to the signal electrode.

Referring to FIGS. 6(a) through 6(c), a brief explanation is given of the principle of the JOERS/ Alvey driving method. FIG. 6(b) shows a non-rewriting-voltage waveform of this driving method, and FIG. 6(c) shows a rewriting-voltage waveform of this driving method. As shown in FIG. 6(a), in this driving method, switching is made between the stable states in a ferroelectric liquid crystal element upon application of a voltage of $|V_s-V_d|$, and switching is not made upon application of $|V_s+V_d|$ that is a higher voltage than the above voltage, as well as upon application of $|V_d|$.

Moreover, so-called the Malvern driving method, disclosed in PCT International Laid-Open Publication W092/02925, etc., is also known as one of the driving methods utilizing the τ-$V_{min}$ characteristic. The Malvern driving method is also one of the driving methods whose non-rewriting-voltage waveform is capable of exerting the anti-memory phenomenon in the ferroelectric liquid crystal element 1 having an element structure that easily exerts the anti-memory phenomenon.

Figure 8:
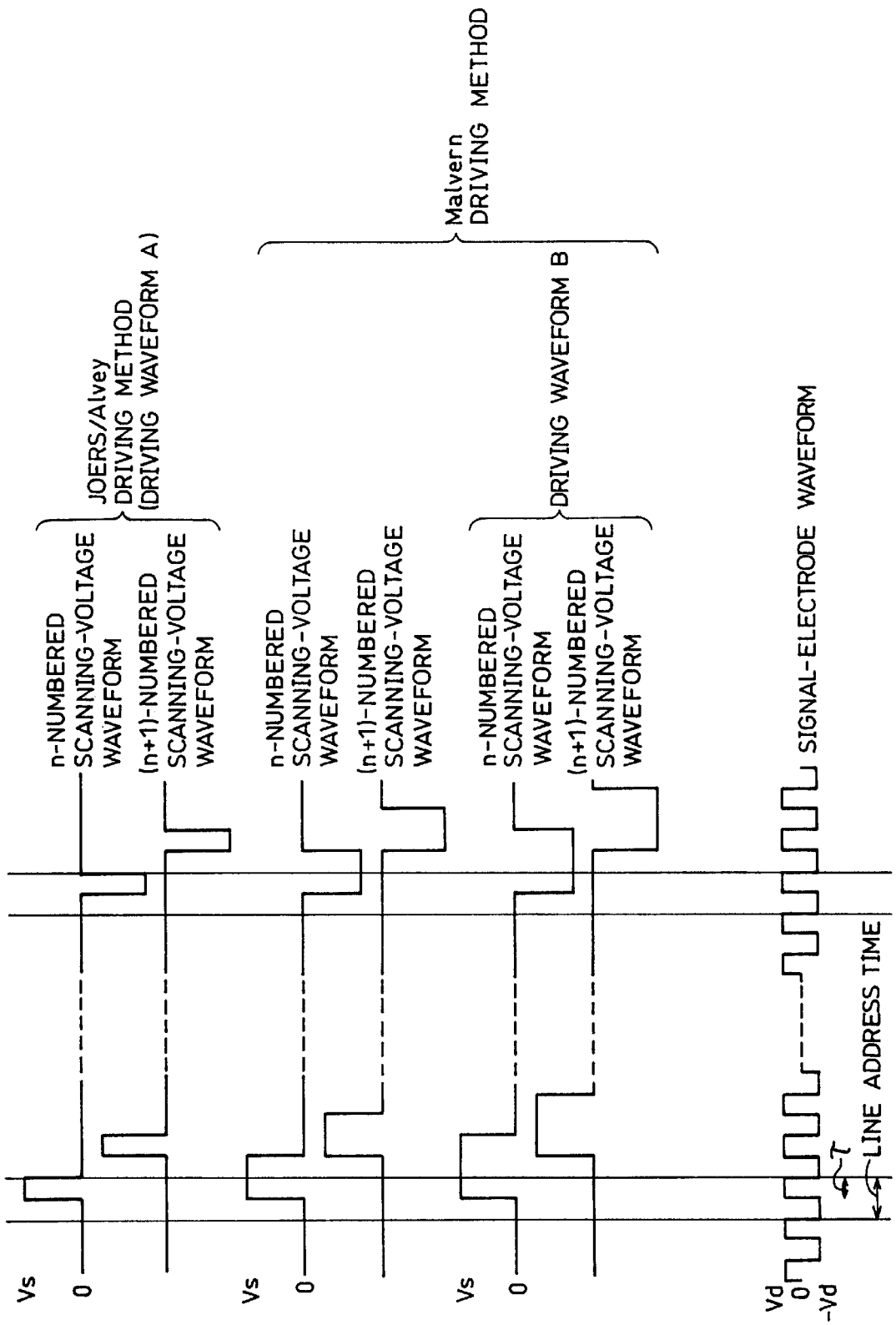
FIG. 8 is a waveform diagram that explains the difference between the driving waveform of the Malvern driving method and the driving waveform of the JOERS/Alvey driving method.

One example of a driving waveform of Malvern driving method is shown as driving waveform B in FIG. 7. Driving waveform B of the Malvern driving method is different from driving waveform A of the aforementioned JOERS/Alvey driving method in the following point: As shown in FIG. 8, in the JOERS/Alvey driving method, driving pulse A uses a 0 V portion of 1 time slot (T) and a main pulse portion of 1 time slot. In contrast, in the Malvern driving method, the width of a main pulse can be changed to a desired length so that the line address time is reduced since periods during which the voltage is applied to the respective electrodes are allowed to overlap each other.

Figure 9:
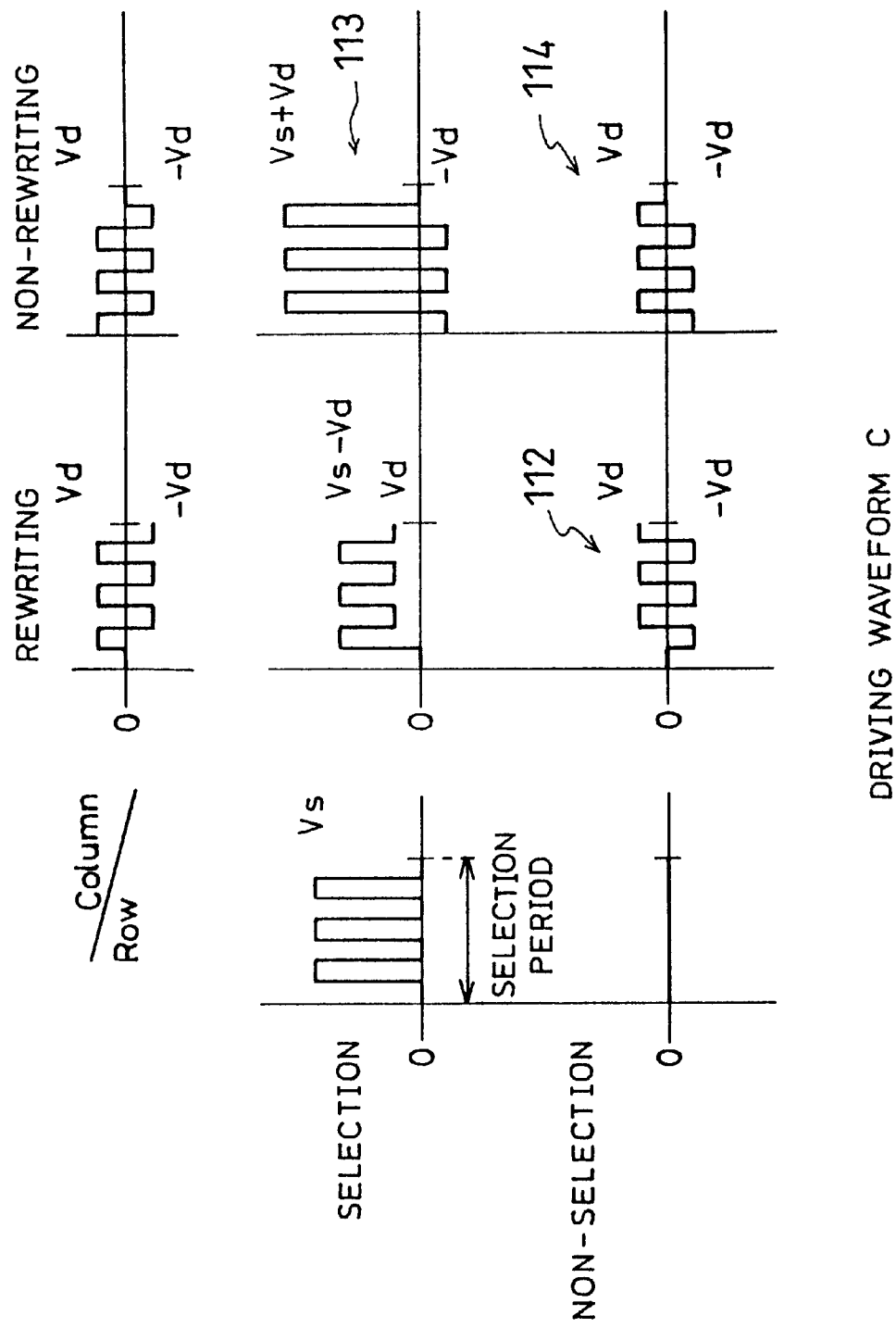
FIG. 9 is a waveform diagram showing a driving waveform of a driving method that is disclosed in Japanese Laid-Open Patent Publication No. 123877(1994) (Tokukaihei 6-123877), which is one of the driving methods having a non-rewriting-voltage waveform that easily exerts an anti-memory phenomenon.

Moreover, driving waveform C, which is shown in FIG. 9, and is a driving method disclosed in Japanese Laid-Open Patent Publication No. 123877/1994 (Tokukaihei 6-123877), is also one of the methods which have a non-rewriting voltage waveform that easily exerts the anti-memory phenomenon. This driving method, which allows a partial rewriting, is preferably applied to liquid crystal elements with a large display capacity, such as those having 2000×2000 lines. In driving waveform C, the pulse width τ is equal in any of the cases when waveforms 112 through 114 shown in FIG. 9, which require no rewriting, are respectively applied, and since the quantity of transmitted light is virtually the same, it is possible to obtain good display without flickers.

Figure 10:
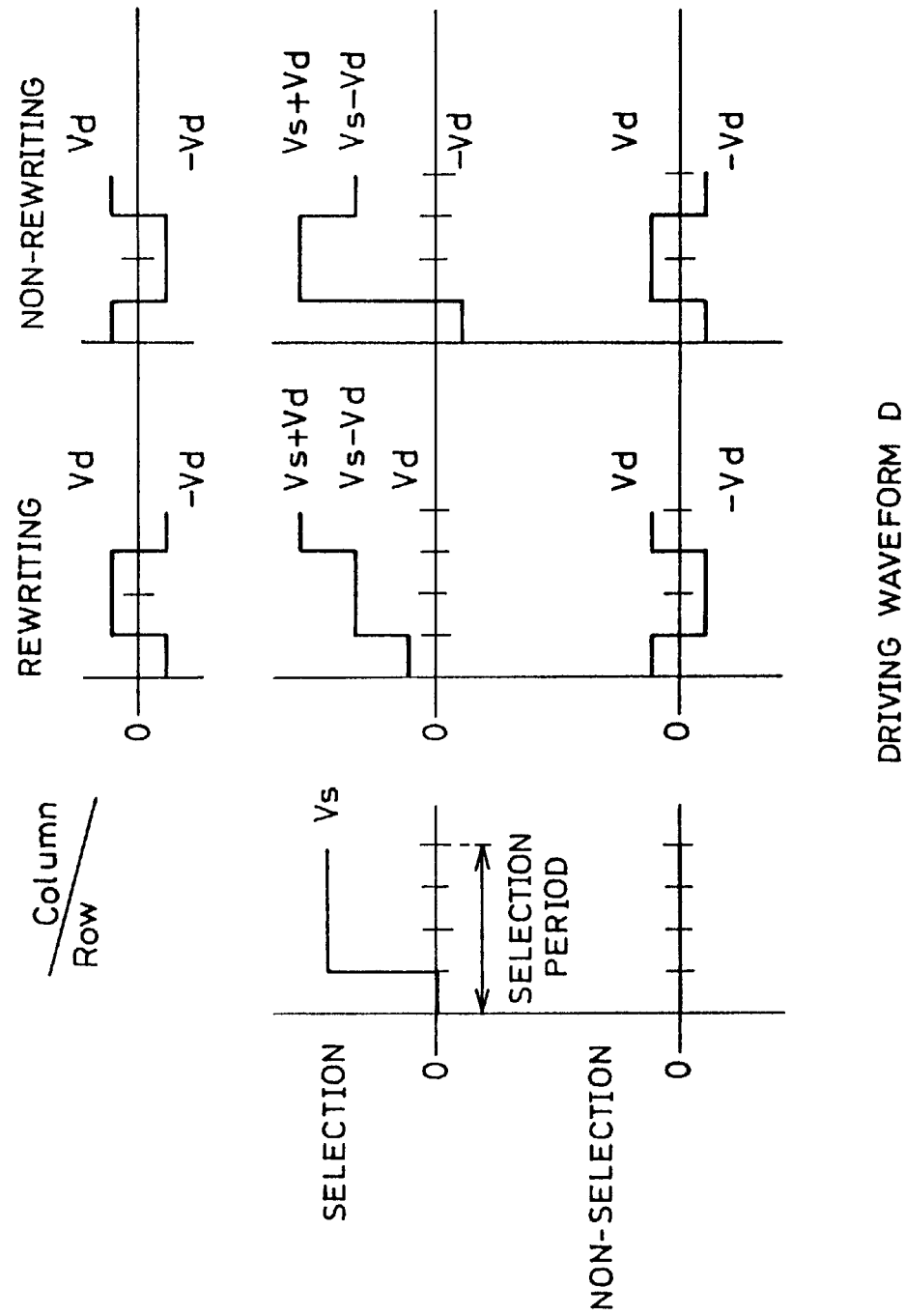
FIG. 10 is a waveform diagram showing a driving waveform of a driving method that is reported in Ferroelectrics, 149,353(1993) by H. Katsuse et al., which is one of the driving methods having a non-rewriting-voltage waveform that easily exerts an anti-memory phenomenon.

Furthermore, driving waveform D, which is shown in FIG. 10, and is a driving method reported in Ferroelectrics, 149, 353(1993) by H. Katsuse et al., is also one of the methods which have a non-rewriting voltage waveform that easily exerts the anti-memory phenomenon. In this driving method, the ratio of the maximum value and minimum value of the numbers of polarity inversions of signal-voltage waveforms that are being applied to pixels irrespective of selection time or non-selection time, that is, the ratio of the number of polarity inversions of signal-voltage waveforms in the case when signal-voltage waveforms instructing "rewriting" and "non-rewriting" are alternately applied and the number of those in the case when either of the two is continuously applied, is represented by 1.5, and compared with the JOERS/Alvey driving method and Malvern driving method whose ratio is 2, this method has an advantage in that crosstalk due to display patterns hardly occurs.

As exemplified by the above-mentioned methods, driving methods, which are applied to a ferroelectric liquid crystal element having the τ-$V_{min}$ characteristic as shown in FIG. 4(b) and which use a non-rewriting-voltage waveform that easily allows the anti-memory phenomenon to be exerted, are characterized by the following points:

In other words, these driving methods are characterized by using voltages of $V_1$, $V_2$, $V_3$ and $V_4$ which satisfy:

$$0<V_2<V_4 \text{ and } V_2-V_1<V_4-V_3,$$

wherein by applying a second pulse voltage $V_2$ following a first pulse voltage $V_1$, or the second pulse voltage $-V_2$ following the first pulse voltage $-V_1$, to pixels on a selected scanning electrode, the ferroelectric liquid crystal element is set in one stable state or the other stable state depending on the polarity of the applied voltages irrespective of the stable state that was held prior to the application of the voltages, while by applying a second pulse voltage $V_4$ following a first pulse voltage $V_3$, or the second pulse voltage $-V_4$ following the first pulse voltage $-V_3$, to pixels on a selected scanning electrode, the stable state of the ferroelectric liquid crystal molecules previously held prior to the application of the voltages is maintained. In other words, in the leading two time slots during a selection period, the pulse voltage of the second time slot in the non-rewriting-voltage waveform is higher than that in the rewriting-voltage waveform, and the difference between the pulse voltage of the first time slot and the pulse voltage of the second time slot is also greater.

For example, such voltages $V_1$, $V_2$, $V_3$ and $V_4$ are represented by:

in driving waveform A shown in FIG. 5

$V_1=V_d, V_2=V_s-V_d, V_3=-V_d, V_4=V_s+V_d,$ in driving waveform B shown in FIG. 7

$V_1=V_d, V_2=V_s-V_d, V_3=-V_d, V_4=V_s+V_d,$ in driving waveform C shown in FIG. 9

$V_1=0, V_2=V_s-V_d, V_3=-V_d, V_4=V_s+V_d$ and in driving waveform D shown in FIG. 10

$V_1=V_d, V_2=V_s-V_d, V_3=-V_d, V_4=V_s+V_d.$

Each of these driving methods of a ferroelectric liquid crystal element having the $\tau$-$V_{min}$ characteristic wherein the pulse width $\tau$ has a minimum value is inherently provided with a driving waveform whose non-rewriting-voltage waveform exerts the anti-memory phenomenon more easily than its rewriting-voltage waveform. Therefore, by applying the driving method to the ferroelectric liquid crystal element 1 having an element structure that easily exerts the anti-memory phenomenon, it becomes possible to exert the anti-memory phenomenon only upon application of the non-rewriting-voltage waveform.

In other words, in conventional ferroelectric liquid crystal elements, the driving margin is provided as a range from not less than a threshold value for completely switching all the region of a pixel by using the rewriting-voltage waveform to not more than a threshold value for completely retaining the display state of all the region of a pixel by using the non-rewriting-voltage waveform. However, with the ferroelectric liquid crystal element 1 of the present embodiment, the anti-memory phenomenon, which makes the liquid crystal unswitchable irrespective of the voltage value or the pulse width, is exerted only upon application of the non-rewriting-voltage waveform; thus, it becomes possible to obtain a wide driving margin. Consequently, it becomes possible to achieve advantages, such as reduction of the signal voltage as well as high speeds of element driving, high-frequency driving waveforms, and high speeds by the increase of the spontaneous polarization of the ferroelectric liquid crystal material, thereby making it possible to provide a high-resolution ferroelectric liquid crystal element with a large display capacity.

Moreover, increased response speed of the liquid crystal material makes it possible to provide time-division gray-scale display and pixel-division gray-scale display which uses a plurality of pixels as one pixel. Furthermore, high frequency of the driving waveform makes it possible to provide various driving waveforms within one selection period; therefore, in the case when, for example, regions having different driving characteristics are desirably formed within a pixel by using a method, such as modifying the element factors such as a cell gap and an electrode shape, it becomes possible to desirably rewrite or maintain the display states of the respective regions within the pixel, and consequently to carry out gray-scale display within one pixel without using the time-division gray-scale display and pixel-division gray-scale display. By combining these arrangements, it is of course possible to provide gray-scale display with a higher degree of gray scales, and also to provide a display element with high quality by using improved gray-scale display.

In addition, the present invention is not intended to be limited to the present embodiment. For example, although some specific driving methods were set forth as driving methods having a non-rewriting-voltage waveform that easily allows the anti-memory phenomenon to be exerted, the present invention is not intended to be limited to these, and other driving methods may of course be adopted.

[EMBODIMENT 3]

Referring to FIGS. 11 through 14, the following description will discuss a more specific embodiment of the present invention. Here, members that have the same functions as those described in aforementioned embodiment are indicated by the same reference numerals and the description thereof is omitted.

On insulating substrates 11 and 16 made of glass substrates, conductive films 12 and 17 are formed by using ITO with a film thickness of 100 nm, thereby providing transparent electrodes. On these transparent electrodes, insulating films 13 and 18, which are made of "Brand Name, NHC-A-2014" manufactured by Nissan Chemical Industries, Ltd., are formed with a film thickness of 100 nm. Further, on these insulating films 13 and 18, alignment layers 14 and 19, which are made of "Brand Name AL8044-R1" manufactured by the Nippon Synthetic Rubber Industry Co., Ltd, are formed with a film thickness of 70 nm, and these layers are subject to a rubbing treatment.

Upper and lower substrates 15 and 20, formed through the above-mentioned processes, are placed so as to have the same rubbing directions, and bonded to each other so as to have a cell thickness of 1.5 $\mu$m. Then, a ferroelectric liquid crystal composition (Brand Name "SCE8") manufactured by Merck & Co., Inc. is injected therebetween. Thus, a ferroelectric liquid crystal element 1 which exhibits a C2 orientation state on the entire surface of the element is completed. Here, the ferroelectric liquid crystal element 1 is provided with an element structure which relatively easily exerts the anti-memory phenomenon.

Figure 11:
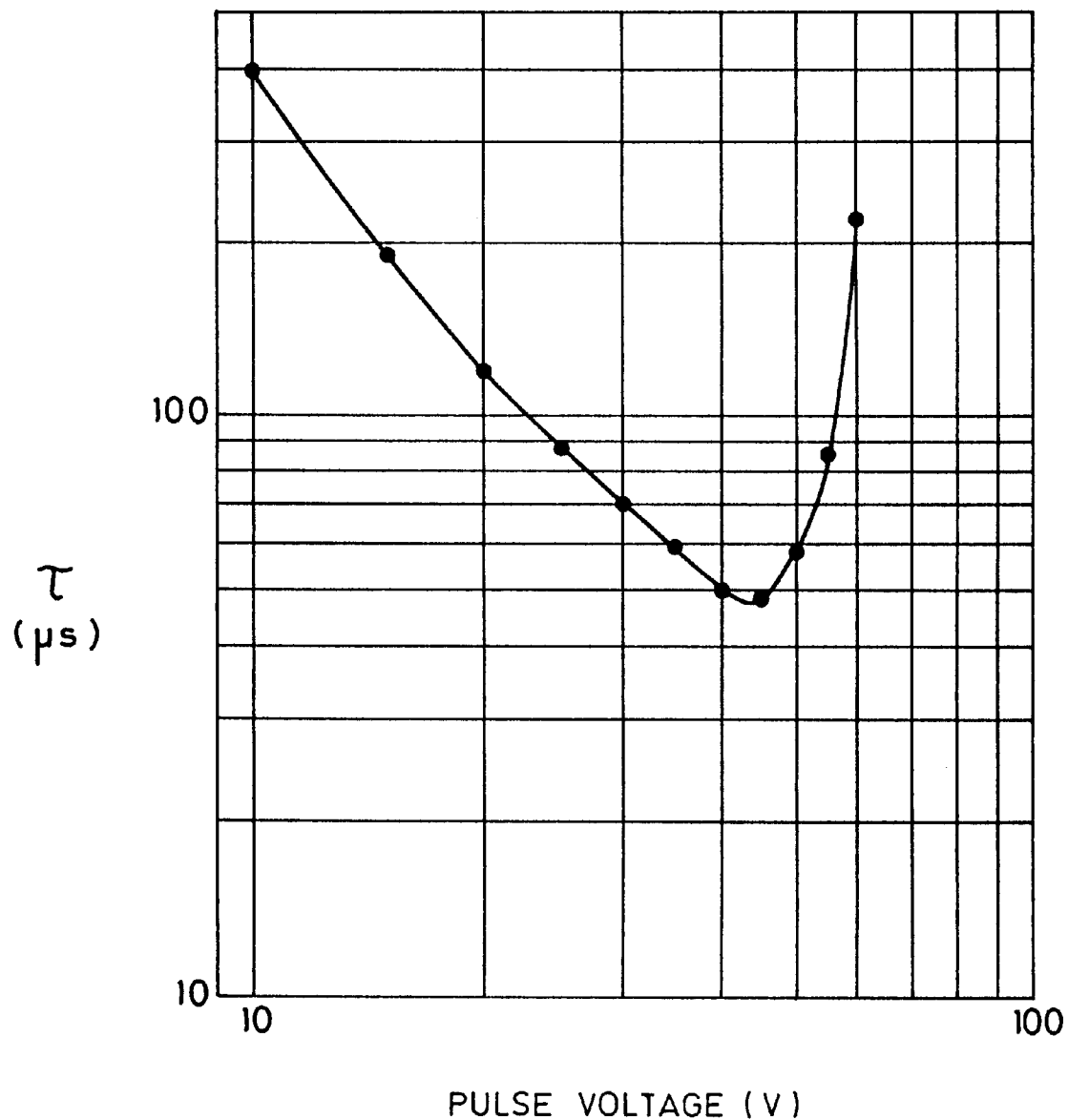
FIG. 11 is a graph that shows the results of measurements that were made at 25° C., to find the pulse width—pulse voltage characteristics of a unipolar pulse that is required for allowing the ferroelectric liquid crystal element of one embodiment of the present invention to completely switch between its two stable states.

Pulse width—pulse voltage characteristics of a unipolar pulse that is required for allowing the ferroelectric liquid crystal element 1 to switch between two stable states were measured at 25° C., and the results are shown in FIG. 11. As indicated by FIG. 11, when the pulse voltage is 45 V, the pulse width T has a minimum value of 48 $\mu$s.

Figure 12:
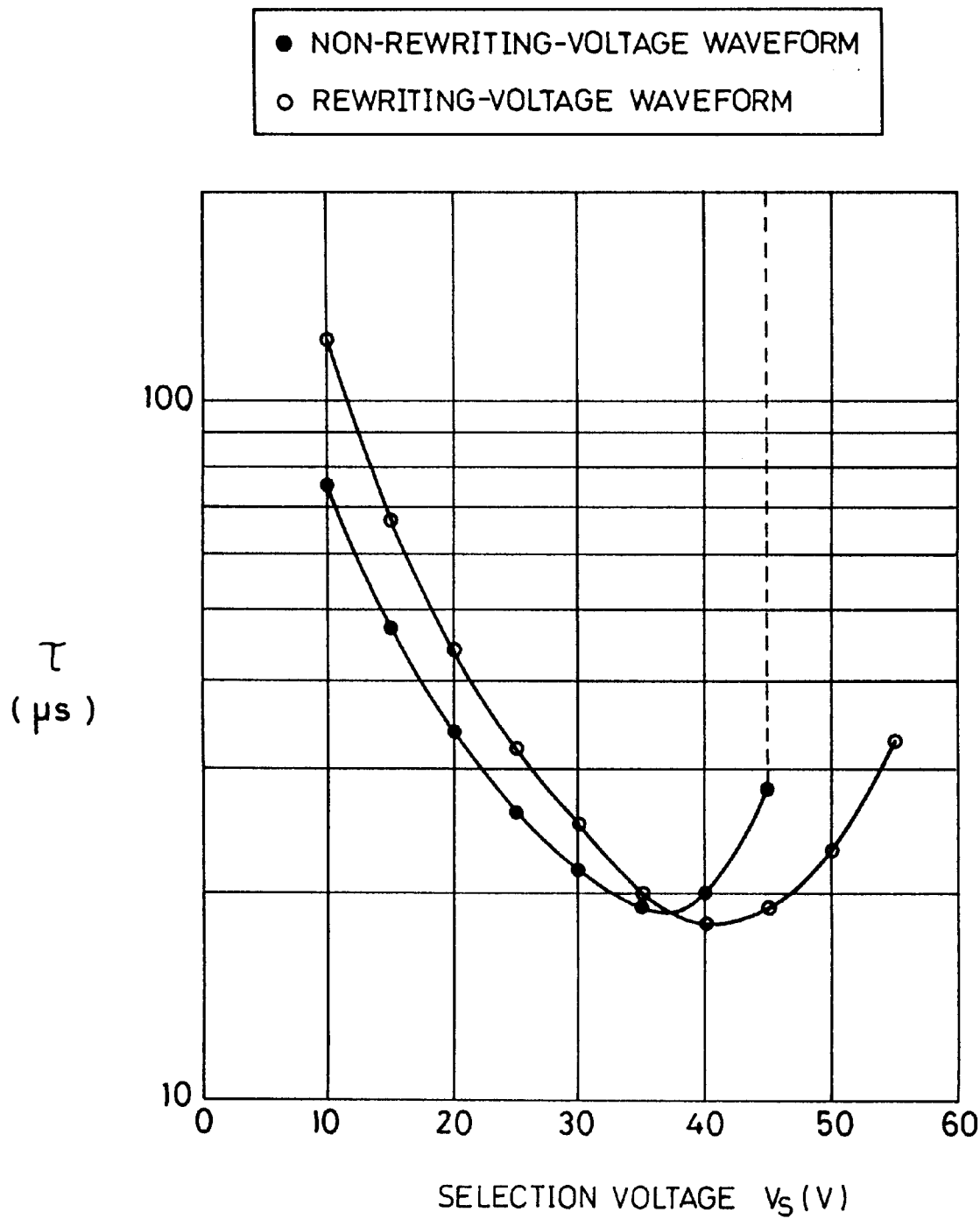
FIG. 12 is a graph that shows the results of measurements that were made on the ferroelectric liquid crystal element of the above-mentioned embodiment by using driving waveform B as shown in FIG. 7 to find a minimum pulse width of the rewriting-voltage waveform that is required for allowing the ferroelectric liquid crystal element to completely switch between its two stable states and a maximum pulse width of the non-rewriting-voltage waveform that is required for completely maintaining a stable state held immediately before, in response to a selection voltage $V_s$.

Next, measurements were respectively made by using driving waveform B as shown in FIG. 7, to find the minimum pulse width of the rewriting-voltage waveform (a) that is required for allowing the ferroelectric liquid crystal element 1 to completely switch between two stable states and the maximum pulse width of the non-rewriting-voltage waveform (c) that is required for completely maintaining the stable state of the ferroelectric liquid crystal element 1 held prior to application of the voltage waveform, in response to the selection voltage $V_s$, and the results are shown in FIG. 12. Here, the signal voltage $V_d$ in driving waveform B is set at 5 V, and the measurements were made at 25° C.

As clearly shown in FIG. 12, a driving operation is available when the selection voltage $V_s$ is approximately not less than 40 V. Moreover, with respect to the characteristics of the non-rewriting-voltage waveform (c), the anti-memory phenomenon is exerted with the selection voltage $V_s$ exceeds 45 V. Furthermore, as shown in FIG. 12, when $V_s$=40 V, a driving operation is available only within the range of $\tau$=18.0 to 20.0 $\mu$s. Although the driving margins are narrow, a driving operation is also available within the following ranges: when $V_s$=45V, within the range of $\tau$=19.0 to 28.0 $\mu$s; when $V_s$=50V and $\tau$ is not less than 23.0 $\mu$s; and when $V_s$=55V and $\tau$ is not less than 33.0 $\mu$s. In other words, when driving is carried out in the range of $V_s$>45V wherein the anti-memory phenomenon is exerted in response to the non-rewriting-voltage waveform, a wide driving margin is obtained in a low-voltage driving operation with a signal voltage $V_d$=5V.

Next, the following ferroelectric liquid crystal element was formed as a comparative example of the ferroelectric liquid crystal element 1 of the present embodiment, and research was made on the driving margin.

[COMPARATIVE EXAMPLE]

A ferroelectric liquid crystal element was formed as a comparative example in the same manner as the aforementioned ferroelectric liquid crystal element 1 except that the film thickness of the alignment layers was set to 120 nm. The orientation state of the ferroelectric liquid crystal element of this comparative example was C2 orientation on the entire surface of the element.

Figure 13:
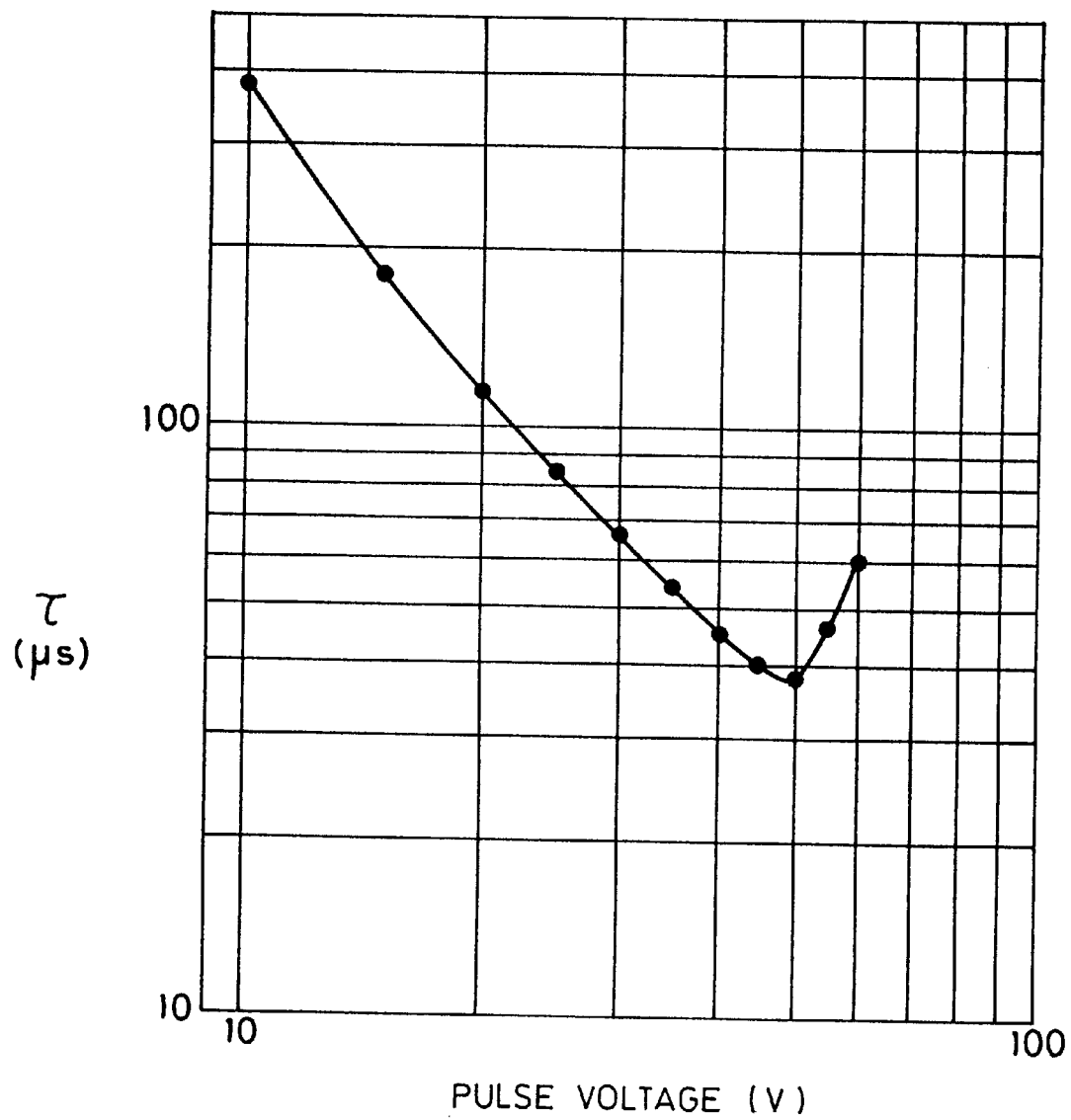
FIG. 13 is a graph that shows the results of measurements that were made at 25° C., to find the pulse width—pulse voltage characteristics of a unipolar pulse that is required for allowing a ferroelectric liquid crystal element provided as a comparative example to the embodiment to completely switch between its two stable states.

Pulse width—pulse voltage characteristics of a unipolar pulse that is required for allowing the ferroelectric liquid crystal element of this comparative example to switch between two stable states were measured at 25° C., and the results are shown in FIG. 13. When the pulse voltage is 50 V, the pulse width has a minimum value of 38 µs.

Figure 14:
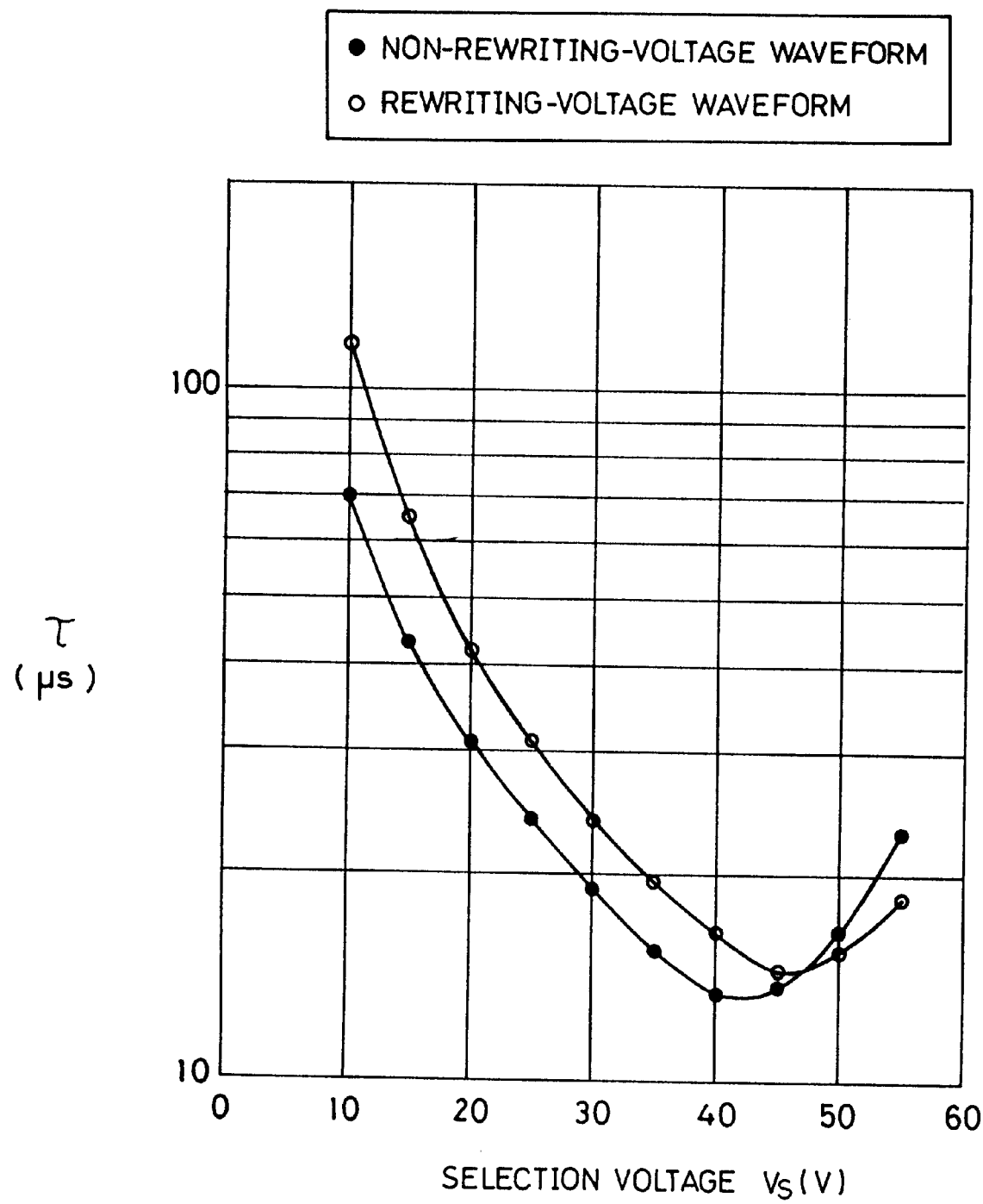
FIG. 14 is a graph that shows the results of measurements that were made on the ferroelectric liquid crystal element of the comparative example by using driving waveform B as shown in FIG. 7 to find a minimum pulse width of the rewriting-voltage waveform that is required for allowing the ferroelectric liquid crystal element to completely switch between its two stable states and a maximum pulse width of the non-rewriting-voltage waveform that is required for completely maintaining a stable state held immediately before, in response to a selection voltage $V_s$.

Measurements were made on the driving pulse width—selection voltage ($V_s$) characteristics at 25° C. with respect to the rewriting-voltage waveform (a) and the non-rewriting-voltage waveform (c) while driving waveform B, shown in FIG. 7, was applied to the ferroelectric liquid crystal element of the comparative example with a signal voltage $V_d$ of 5V, and the results are shown in FIG. 14. Here, the driving pulse width τ thus measured has a minimum pulse width that is required for allowing the ferroelectric liquid crystal element of the comparative example to completely switch between two stable states in response to the rewriting-voltage waveform, and also has a maximum pulse width that is required for completely maintaining the stable state of the ferroelectric liquid crystal element of the comparative example held prior to application of the voltage waveform, in response to the non-rewriting-voltage waveform.

Although a driving operation was available when the selection voltage $V_s$ was approximately not less than 50V, only a narrow driving margin was obtained: that is, when $V_s$=50V, τ=15.5 to 16.5 µs, and when $V_s$=55V, τ=18.5 to 23.0 µs.

Additionally, the above-mentioned description merely shows one preferable embodiment, and the present invention is not intended to be limited thereby. With respect to factors, such as ferroelectric liquid crystal compositions, various film thicknesses and driving methods, various modifications may be adopted within the scope of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A ferroelectric liquid crystal element, which is formed by sandwiching a ferroelectric liquid crystal between a pair of substrates having at least electrodes, characterized in that molecules of the ferroelectric liquid crystal are allowed to switch between bistable states in response to a waveform of a rewriting voltage applied, while the ferroelectric liquid crystal exerts an anti-memory phenomenon in response to a waveform of a non-rewriting voltage.

2. The ferroelectric liquid crystal element as defined in claim 1, wherein: each of the pair of substrates has an alignment layer which has been subjected to a uniaxial alignment treatment and a pointing direction of a chevron smectic-layer structure of the ferroelectric liquid crystal is the same as the direction of the uniaxial alignment treatment of the alignment layer.

3. The ferroelectric liquid crystal element as defined in claim 2, which has a pre-tilt angle in the range of 1 to 15°.

4. The ferroelectric liquid crystal element as defined in claim 1, wherein the ferroelectric liquid crystal has a negative dielectric anisotropy.

5. The ferroelectric liquid crystal element as defined in claim 1, wherein: the ferroelectric liquid crystal has bistable states, and in the relationship between a pulse width and pulse voltage of a unipolar pulse that is required for switching from one stable state to the other stable state, a pulse voltage for providing a minimum value of the pulse width exists.

6. The ferroelectric liquid crystal element as defined in claim 1, wherein: pulse voltages of the first two time slots in the rewriting-voltage waveform are successively represented by $V_1$ and $V_2$ or $-V_1$ and $-V_2$, and pulse voltages of the first two time slots in the non-rewriting-voltage waveform are successively represented by $V_3$ and $V_4$ or $-V_3$ and $-V_4$, said $V_1$, $V_2$, $V_3$ and $V_4$ being allowed to satisfy:

$$0<V_2<V_4 \text{ and } V_2-V_1<V_4-V_3.$$

7. A liquid crystal display comprising:
a ferroelectric liquid crystal element as defined in claim 6; and
a driving circuit for applying to the electrodes a selection voltage $V_s$ and a signal voltage $V_d$ which satisfy the following relationships:

$$V_1=V_d, V_2=V_s-V_d, V_3=-V_d, \text{ and } V_4=V_s+V_d.$$

8. The liquid crystal display as defined in claim 7, wherein: a selection period, during which either one of the electrodes formed on one of the substrates is selected, is constituted by two time slots; and the driving circuit includes a scanning-electrode driving circuit which applies the selection voltage $V_s$ that lasts for at least one slot to the electrodes, starting from the second time slot in the selection period.

9. The liquid crystal display as defined in claim 7, wherein: a selection period, during which either one of the electrodes formed on one of the substrates is selected, is constituted by four time slots; and the driving circuit includes a scanning-electrode driving circuit which applies the selection voltage $V_s$ that lasts for at least three time slots to the electrodes, starting from the second time slot in the selection period.

10. A liquid crystal display comprising:
a ferroelectric liquid crystal element as defined in claim 6; and
a driving circuit for applying to the electrodes a selection voltage $V_s$ and a signal voltage $V_d$ which satisfy the following relationships:

$$V_1=0, V_2=V_s-V_d, V_3=-V_d, \text{ and } V_4=V_s+V_d.$$

11. The ferroelectric liquid crystal element as defined in claim 1, wherein the waveform of the non-rewriting voltage in response to which the ferroelectric liquid crystal exerts said anti-memory phenomenon has a pulse width which is greater than that of the waveform of the rewriting voltage.

12. A ferroelectric liquid crystal material, which is used for a ferroelectric liquid crystal element that is formed by sandwiching a ferroelectric liquid crystal between a pair of substrates having at least electrodes, characterized in that molecules of the ferroelectric liquid crystal are allowed to switch between bistable states in response to a waveform of a rewriting voltage applied by the electrodes, while the ferroelectric liquid crystal exerts an anti-memory phenomenon in response to a waveform of a non-rewriting voltage.

13. The ferroelectric liquid crystal material as defined in claim 12, which has a negative dielectric anisotropy.

14. The ferroelectric liquid crystal material as defined in claim 12, wherein: bistable states are provided in the ferroelectric liquid crystal element; and in the relationship between a pulse width and pulse voltage of a unipolar pulse that is required for switching from one stable state to the other stable state, a pulse voltage for providing a minimum value of the pulse width exists.

15. The ferroelectric liquid crystal material as defined in claim 12, wherein: pulse voltages of first two time slots in the rewriting-voltage waveform are successively represented by $V_1$ and $V_2$ or $-V_1$ and $-V_2$, and pulse voltages of first two time slots in the non-rewriting-voltage waveform are successively represented by $V_3$ and $V_4$ or $-V_3$ and $-V_4$, said $V_1$, $V_2$, $V_3$ and $V_4$ satisfying:

$$0 < V_2 < V_4 \text{ and } V_2 - V_1 < V_4 - V_3.$$

16. The ferroelectric liquid crystal material as defined in claim 12, further comprising an ionic substance which exerts a reverse electric field in response to the non-rewriting-voltage waveform.

* * * * *